US008896722B2

(12) United States Patent
Suzuki

(10) Patent No.: US 8,896,722 B2
(45) Date of Patent: Nov. 25, 2014

(54) IMAGE DATA PROCESSING APPARATUS AND ELECTRONIC CAMERA

(71) Applicant: Nikon Corporation, Tokyo (JP)

(72) Inventor: Masahiro Suzuki, Inzai (JP)

(73) Assignee: Nikon Corporation, Tokyo (JP)

( * ) Notice: Subject to any disclaimer, the term of this patent is extended or adjusted under 35 U.S.C. 154(b) by 2 days.

(21) Appl. No.: 13/827,703

(22) Filed: Mar. 14, 2013

(65) Prior Publication Data
US 2013/0194449 A1 Aug. 1, 2013

Related U.S. Application Data

(63) Continuation of application No. 13/064,811, filed on Apr. 18, 2011, now abandoned, which is a continuation of application No. 11/319,274, filed on Dec. 29, 2005, now abandoned, which is a continuation of application No. 09/945,847, filed on Sep. 5, 2001, now abandoned.

(30) Foreign Application Priority Data

Sep. 6, 2000 (JP) ................................ 2000-270396

(51) Int. Cl.
H04N 5/228 (2006.01)
H04N 1/393 (2006.01)
G06T 3/40 (2006.01)
H04N 1/56 (2006.01)
H04N 5/225 (2006.01)

(52) U.S. Cl.
CPC ............. *H04N 5/225* (2013.01); *H04N 1/3935* (2013.01); *G06T 3/4015* (2013.01); *H04N 1/56* (2013.01)
USPC ......................... 348/222.1; 348/273; 382/300

(58) Field of Classification Search
USPC .................. 348/222.1, 223.1, 246, 272, 273; 382/298–300
See application file for complete search history.

(56) References Cited

U.S. PATENT DOCUMENTS 4,821,121 A 4/1989 Beaulier
5,253,046 A 10/1993 Shiraishi
5,349,451 A 9/1994 Dethardt
(Continued)

FOREIGN PATENT DOCUMENTS

EP 0 502 539 A2 9/1992
EP 0 589 721 A1 3/1994
(Continued)

OTHER PUBLICATIONS

Aug. 31, 2010 Japanese Final Rejection issued in Japanese Patent Application No. 2000-270396 with English translation.
(Continued)

Primary Examiner — Paul Berardesca
(74) Attorney, Agent, or Firm — Oliff PLC

(57) ABSTRACT

An image data processing apparatus includes a data size conversion device that changes a data size of an image data at an optional ratio, the image data has a plurality of pixels each of which includes any one of a plurality of color components, and the plurality of color components being arranged in a specific order. The data size conversion device newly calculates a value of color component of each pixel after changing the data size based upon values of color components of a plurality of same color pixels before changing the data size, while maintaining the order of arrangement of the plurality of color components.

9 Claims, 16 Drawing Sheets

(56) References Cited

U.S. PATENT DOCUMENTS

| | | |
|---|---|---|
| 5,418,565 A | 5/1995 | Smith |
| 5,481,304 A | 1/1996 | Park et al. |
| 5,493,335 A | 2/1996 | Parulski et al. |
| 5,734,427 A | 3/1998 | Hayashi |
| 6,006,039 A | 12/1999 | Steinberg et al. |
| 6,091,862 A | 7/2000 | Okisu |
| 6,236,433 B1 | 5/2001 | Acharya et al. |
| 6,348,929 B1 | 2/2002 | Acharya et al. |
| 6,593,965 B1 | 7/2003 | Miyamoto |
| 6,650,366 B2 | 11/2003 | Parulski et al. |
| 6,697,110 B1 | 2/2004 | Jaspers et al. |
| 6,937,277 B1 | 8/2005 | Hattori et al. |
| 7,295,765 B1 | 11/2007 | Kijima |

FOREIGN PATENT DOCUMENTS

| | | |
|---|---|---|
| EP | 1 022 912 A2 | 7/2000 |
| JP | A-7-7634 | 1/1995 |
| JP | A-7-312714 | 11/1995 |
| JP | A-8-317295 | 11/1996 |
| JP | A-11-103407 | 4/1999 |
| JP | A-11-187286 | 7/1999 |
| JP | A-11-308535 | 11/1999 |
| JP | A-2000-175205 | 6/2000 |
| WO | WO 00/19728 | 4/2000 |

OTHER PUBLICATIONS

European Office Action issued Aug. 16, 2011 for corresponding European Application No. 01307532.0.

Jun. 19, 2012 Office Action issued in Japanese Patent Application No. 2000-270396 w/translation.

Jan. 10, 2012 Office Action issued in Japanese Patent Application No. 2000-270396 (with translation).

Sep. 14, 2012 Office Action issued in parent U.S. Appl. No. 13/064,811.

Jun. 7, 2013 Office Action issued in European Patent Application No. 01 307 532.0.

Oct. 9, 2013 Minutes of the Oral Proceedings issued in European Patent Application No. 01307532.0.

|   | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|----|----|----|----|----|----|----|----|----|----|----|
| 1 | B | G | B | G | B | G | B |   |   |    |    |    |    |    |    |    |    |    |    |    |
| 2 | G | R | G | R | G | R | G |   |   |    |    |    |    |    |    |    |    |    |    |    |
| 3 | B | G | (B)| G | B | G | B |   |   |    |    |    |    |    |    |    |    |    |    |    |
| 4 | G | R | G |(R)| G | R | G |   |   |    |    |    |    |    |    |    |    |    |    |    |
| 5 | B | G | B | G | B | G | B |   |   |    |    |    |    |    |    |    |    |    |    |    |
| 6 | G | R | G | R | G | R | G |   |   |    |    |    |    |    |    |    |    |    |    |    |
| 7 |   |   |   |   |   |   |   |   |   |    |    |    |    |    |    |    |    |    |    |    |
| 8 |   |   |   |   |   |   |   |   |   |    |    |    |    |    |    |    |    |    |    |    |

D51 (column 5 marker)
D52 (near row 7-8, column 1)

D12 (12×12 INPUT DATA)
D16 (16×16 INPUT DATA)
D20 (20×20 INPUT DATA)

| R-G(i-2, j-2) | 0 | R-G(i, j-2) | 0 | R-G(i+2, j-2) |
|---|---|---|---|---|
| 0 | 0 | 0 | 0 | 0 |
| R-G(i-2, j) | 0 | R-G(i, j) | 0 | R-G(i+2, j) |
| 0 | 0 | 0 | 0 | 0 |
| R-G(i-2, j+2) | 0 | R-G(i, j+2) | 0 | R-G(i+2, j+2) |

FIG.14

| G | Ye | G | Ye | G | Ye | G | Ye | ... |
|---|---|---|---|---|---|---|---|---|
| Cy | Ma | Cy | Ma | Cy | Ma | Cy | Ma | ... |
| G | Ye | G | Ye | G | Ye | G | Ye | ... |
| Cy | Ma | Cy | Ma | Cy | Ma | Cy | Ma | ... |
| G | Ye | G | Ye | G | Ye | G | Ye | ... |
| Cy | Ma | Cy | Ma | Cy | Ma | Cy | Ma | ... |
| G | Ye | G | Ye | G | Ye | G | Ye | ... |

FIG.15

| G | B | G | B | G | B | G | B | ... |
|---|---|---|---|---|---|---|---|---|
| R | G | R | G | R | G | R | G | ... |
| G | B | G | B | G | B | G | B | ... |
| R | G | R | G | R | G | R | G | ... |
| G | B | G | B | G | B | G | B | ... |
| R | G | R | G | R | G | R | G | ... |
| G | B | G | B | G | B | G | B | ... |

IMAGE DATA PROCESSING APPARATUS AND ELECTRONIC CAMERA

This is a Continuation of application Ser. No. 13/064,811, filed Apr. 18, 2011, which is a Continuation of application Ser. No. 11/319,274 filed Dec. 29, 2005, which is a Continuation of application Ser. No. 09/945,847 filed Sep. 5, 2001. The entire disclosure of the prior application is hereby incorporated by reference herein in its entirety.

INCORPORATION BY REFERENCE

The disclosure of the following priority application is herein incorporated by reference:
Japanese Patent Application No. 2000-270396 filed Sep. 6, 2000

BACKGROUND OF THE INVENTION

1. Field of the Invention

The present invention relates to an image data processing apparatus which performs data size conversion upon image data which have been imaged, for example, via color separation filters of the Bayer type, and to an electronic camera.

2. Description of the Related Art

There is a per se known type of electronic still camera which performs specified image processing upon image data produced from an image of a photographic subject which has been imaged through a photographic lens by an imaging device incorporating an imaging element such as a CCD or the like and outputted by the imaging device. In an imaging device of such an electronic still camera, a color separation filter is provided upon the imaging element for forming a colored image. FIG. 15 is a figure for explanation of a Bayer type color separation filter, in which primary color filters for R color, G color, and B color are arranged in a checkerboard pattern in correspondence to the pixels of the imaging element. As shown in FIG. 15, in this Bayer arrangement, a filter for the same color component is provided at each second pixel in both the horizontal direction and the vertical direction in which the pixels are arranged. It is necessary to treat image data which has been imaged through such a color separation filter in such a manner as to preserve the Bayer arrangement. This is because, if the Bayer arrangement is disturbed, it becomes impossible to reproduce the colors of the photographic subject from the image data.

In the case of performing reduction (shrinkage) size conversion upon the above described image data, if the pixel data are read out while subsampling or culling every second pixel, or every fourth pixel, . . . in the horizontal direction and in the vertical direction, i.e. at a multiple of two, the order of the color components which correspond to the pixel data before subsampling and the order of the color components of the pixel data which have been subsampled and read out agree with one another. The shaded pixels in FIG. 15 are the pixel positions in the case of reading out at a rate of one pixel every five pixels. When performing reduction size conversion by subsampling while reading out in this manner, it is only possible to perform size conversion at a reduction ratio by subsampling at a multiple of two in the horizontal direction and the vertical direction respectively, in other words at a fixed reduction ratio like 2/4, 2/6, . . . . Furthermore, even if it is arranged that the Bayer arrangement after performing reduction size conversion is not disturbed, the spatial frequency is reduced by the subsampling, which gives rise to the problem of undesirable generation of moire due to subsampling.

SUMMARY OF THE INVENTION

The objective of the present invention is to provide an image data processing apparatus and an electronic camera which perform image data size conversion processing to convert image data size at any optional ratio without confusing the order of arrangement of the color components of image data which have been imaged through a color separation filter such as one of the Bayer type.

An image data processing apparatus according to the present invention comprises a data size conversion device that changes a data size of an image data at an optional ratio, the image data has a plurality of pixels each of which includes any one of a plurality of color components, and the plurality of color components being arranged in a specific order. The data size conversion device newly calculates a value of color component of each pixel after changing the data size based upon values of color components of a plurality of same color pixels before changing the data size, while maintaining the order of arrangement of the plurality of color components.

In this image data processing apparatus, it is preferred that an interpolation processing device that performs interpolation processing to obtain a value of color component that a corresponding pixel does not possess, is further provided. The data size conversion device changes the data size of the image data before the image data is subjected to interpolation processing by the interpolation processing device. In this case, it is preferred that a changeover device that changes over image data to be supplied to the interpolation device between image data a data size of which has been changed by the data size conversion device and image data a data size of which has not been changed by the data size conversion device, is further provided. The interpolation processing device performs the interpolation processing with a common algorithm on both the image data the data size of which has been changed and the image data the data size of which has not been changed.

Also, it is preferred that the data size conversion device calculates the value of color component of each pixel after changing the data size by taking a relative positional relationship between the each pixel after changing the data size and the plurality of same color pixels before changing the data size.

An image data processing apparatus according to the present invention comprises: a color separation device in which a plurality of color filters, each of which passes light of one of a plurality of color components, are arranged in a specified order, and which separates an image of a subject into the plurality of color components; an imaging device which images the image of the subject which has been color-separated by the color separation device with a plurality of pixels; an A/D conversion device which A/D converts an image signal outputted from the imaging device; and a data size conversion device which changes a data size of the image data after A/D conversion at an optional ratio. The data size conversion device newly calculates a value of color component of each pixel after changing the data size based upon values of color components of a plurality of same color pixels before changing the data size, while maintaining the order of arrangement of the plurality of color components.

An electronic camera according to the present invention comprises: a color separation device in which a plurality of color filters, each of which passes light of one of a plurality of color components, are arranged in a specified order, and which separates an image of a subject into the plurality of color components; an imaging device which images the image of the subject which has been color-separated by the color separation device with a plurality of pixels; an A/D conversion device which A/D converts an image signal outputted from the imaging device; and a data size conversion device which changes a data size of the image data after A/D conversion at an optional ratio. The data size conversion device newly calculates a value of color component of each pixel after changing the data size based upon values of color components of a plurality of same color pixels before changing the data size, while maintaining the order of arrangement of the plurality of color components.

An image data processing method according to the present invention comprises: obtaining an image data that has a plurality of pixels each of which includes any one of a plurality of color components which are arranged in a specific order; and changing a data size of the image data at an optional ratio. And a value of color component of each pixel after changing the data size is newly calculated based upon values of color components of a plurality of same color pixels before changing the data size in order to change the data size while maintaining the order of arrangement of the plurality of color components.

A computer-readable computer program product according to the present invention containing a control program for image data size conversion processing. The control program comprises instructions of: obtaining an image data that has a plurality of pixels each of which includes any one of a plurality of color components which are arranged in a specific order; and changing a data size of the image data at an optional ratio. And a value of color component of each pixel after changing the data size is newly calculated based upon values of color components of a plurality of same color pixels before changing the data size in order to change the data size while maintaining the order of arrangement of the plurality of color components.

In this computer-readable computer program product, it is preferred that the computer-readable computer program product is a recording medium on which the control program is recorded.

Also, it is preferred that the computer-readable computer program product is a carrier wave in which the control program is embodied as a data signal.

BRIEF DESCRIPTION OF THE DRAWINGS

FIG. 5 is a figure showing a color separation filter in the Bayer arrangement.

FIG. 6 is a figure for explanation of the details of the processing performed by a G interpolation circuit.

FIG. 9 is a figure for explanation of the details of the processing performed by a color difference signal generation circuit.

FIG. 10 is a figure showing an example of data which is processed by an interpolation/LPF circuit.

FIG. 14 is a figure showing a color separation filter arranged according to the complementary color filter arrangement method.

FIG. 15 is a figure for explanation of a subsampling procedure for image data which have been imaged through a color separation filter of the Bayer type.

DESCRIPTION OF THE PREFERRED EMBODIMENTS

In the following, embodiments of the present invention will be explained with reference to the figures.

Embodiment 1

Figure 1:
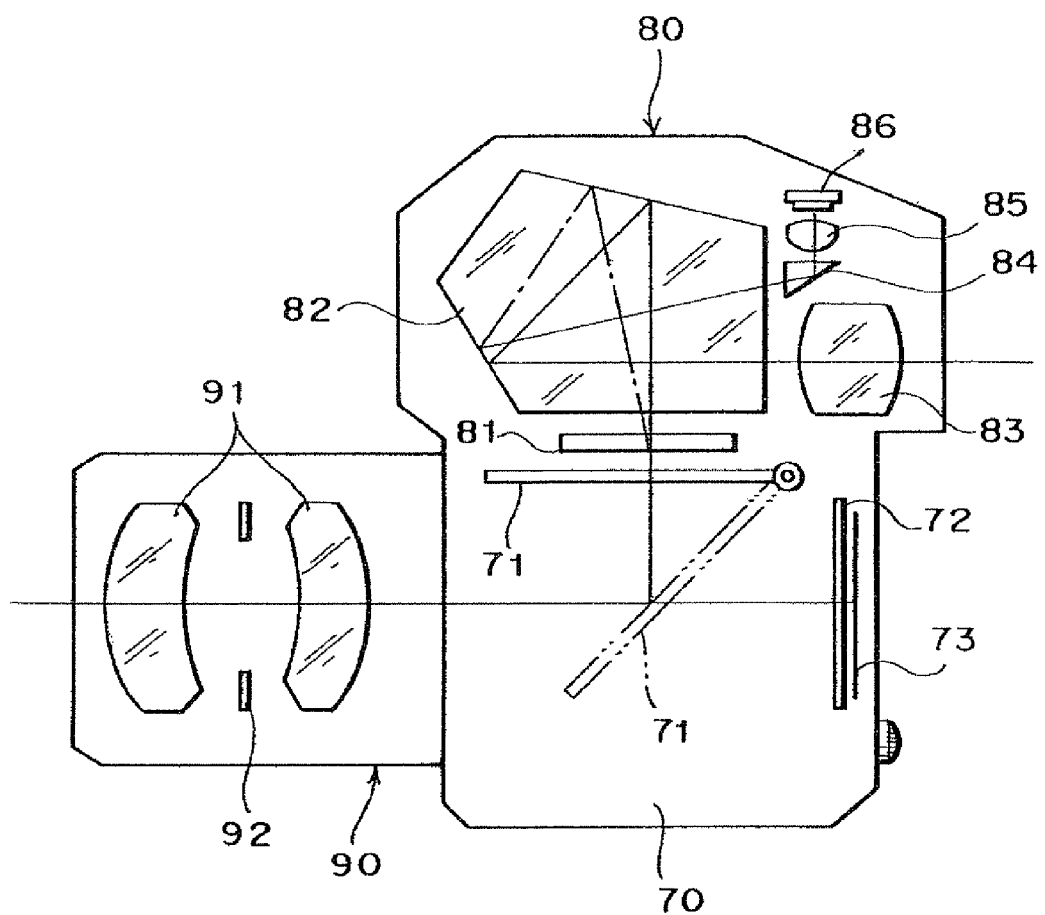
FIG. 1 is a figure showing the structure of a single lens reflex electronic still camera which is an embodiment of the present invention.

As shown in FIG. 1, the single lens reflex electronic still camera according to the present invention is comprised of a camera main body 70, a viewfinder device 80 which can be fitted to or removed from the camera main body 70, and an interchangeable lens 90 which comprises a photographic lens 91 and an aperture 92 and which can be fitted to or removed from the camera main body 70. Light from a photographic subject enters into the camera main body 70 through the interchangeable lens 90, and, before shutter release, is directed by a quick return mirror 71 which is in its position shown by the dotted lines into the viewfinder device 80, where it is focused into an image upon a viewfinder matte 81. This image of the photographic subject is also directed by a pentaprism 82 into an eyepiece lens 83. On the other hand, after shutter release, the quick return mirror 71 is rotated to its position shown by solid lines in the figure, and the light from the photographic subject passes through a shutter 72 and forms an image upon an imaging device 73. Before shutter release, the image of the photographic subject is incident via a prism 84 and an imaging lens 85 upon a white balance sensor 86, and this white balance sensor 86 detects the color temperature of the photographic subject.

Figure 2:
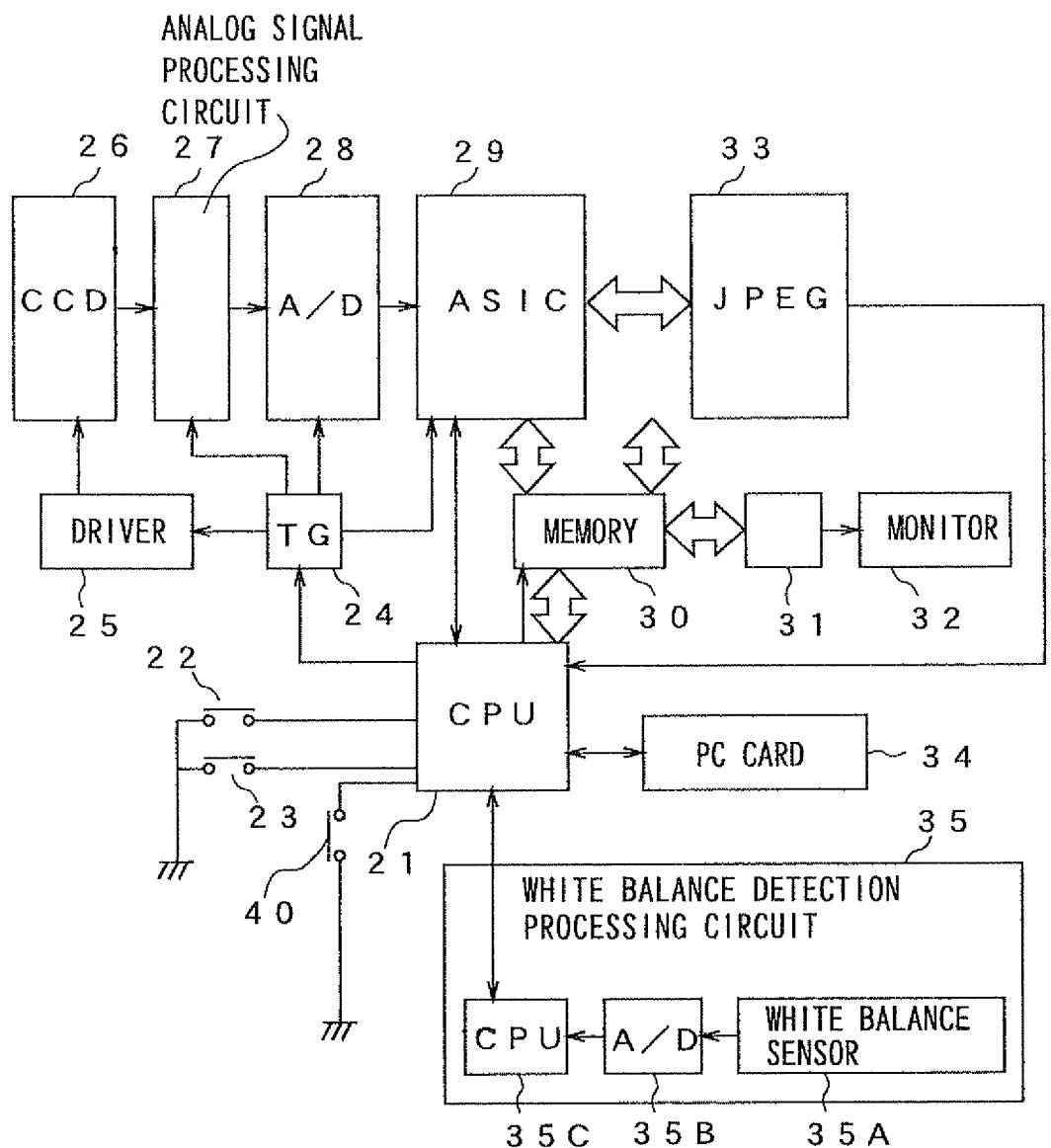
FIG. 2 is a block diagram of an embodiment of a signal processing system in this single lens reflex electronic still camera.

FIG. 2 is a block diagram of the single lens reflex electronic still camera according to the first preferred embodiment. A half press signal and a full press signal are respectively inputted to a CPU 21 from a half press switch 22 and a full press switch 23, both of which are actuated by the operation of a shutter release button not shown in the figures. Furthermore, an actuation signal from a resize switch 40 for converting the data size of the image data is inputted to the CPU 21. When the half press signal is inputted to the CPU 21, the CPU 21 controls the operation of a CCD 26 of the imaging device 73 via a timing generator 24 and a driver 25. The operational timings of an analog signal processing circuit 27 and of an A/D conversion circuit 28 are controlled by the output signal of the timing generator 24. Furthermore, the CPU 21 controls the driving of a white balance detection processing circuit 35. A color filter is provided upon the pixel region of the CCD 26.

When subsequently to the actuation to ON of the half press switch 22 the full press switch 23 is actuated to ON, the quick return mirror 71 is rotated to its upper position. The light from the photographic subject which passes through the interchangeable lens 90 is focused thereby into an image upon the light reception surface of the CCD 26, and signal electric charges are accumulated in the CCD 26 according to the brightness of the image of the photographic subject. These signal electric charges accumulated in the CCD 26 are emitted by the driver 25 and are inputted to the analog signal processing unit 27 which comprises an AGC circuit and a CDS circuit. This analog signal processing circuit 27 performs analog processing such as gain control, noise removal and the like upon the analog image signal which has been inputted. The image signal after this analog processing is converted into a digital signal by the A/D conversion circuit 28. The image data which has been thus converted into digital format is fed to an image processing circuit 29 which may for example be an ASIC, which performs image pre-processing such as white balance adjustment, contour compensation, gamma correction, and the like.

The white balance detection processing circuit 35 comprises a white balance sensor 35A (the white balance sensor 86 of FIG. 1) which is a color temperature sensor, an A/D conversion circuit 353 which converts the analog signal from the white balance sensor 35A into a digital signal, and a CPU 35C which generates a white balance adjustment signal based upon this digital color temperature signal. The white balance sensor 35A may, for example, comprise a plurality of photoelectric conversion elements for red light, blue light and green light each of which has its own characteristic sensitivity, and said white balance sensor 35A receives light from the image of the photographic field as a whole. The CPU 35C calculates a R-gain and a B-gain based upon the output of a plurality of photoelectric conversion elements. These calculated gains are transferred to predetermined registers of the CPU 21 and are stored therein. Furthermore, the white balance sensor 86 of FIG. 1 may be constituted by a two dimensional CCD of 24 columns×20 rows. In this case, the CCD is divided into 16 regions, and in each of the regions there is arranged a plurality of elements, each of which has its own sensitivity to red light, blue light or green light.

If the resize switch 40 is set for image size conversion, the digital image data which has thus been pre-processed is further subjected to image data size conversion processing. The image data after resize processing is then subjected to format processing (image post-processing) for JPEG compression, and then is temporarily stored in a buffer memory 30.

This image data which has been stored in the buffer memory 30 is processed into image data for display by a display image generation circuit 31, and is then displayed upon an external monitor 32 such as a LCD or the like as the result of photography. Furthermore, this image data which has been stored in the buffer memory 30 is also subjected to data compression at a predetermined compression ratio by the JPEG method, and is then stored upon a recording medium 34 such as a compact flash memory card (CF card) or the like.

Figure 3:
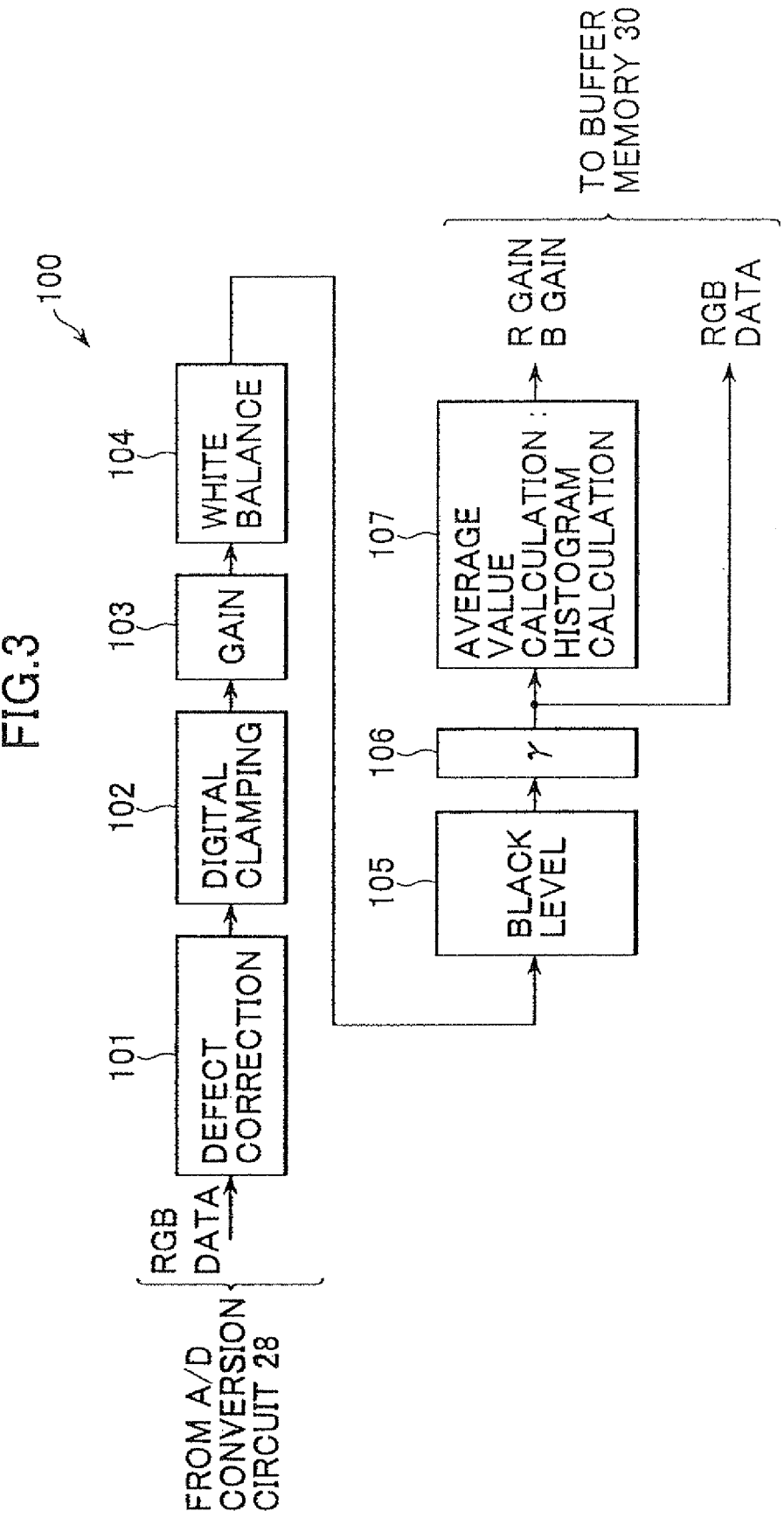
FIG. 3 is a block diagram for explanation of a circuit which performs line processing in the signal processing system shown in FIG. 2.
Figure 4:
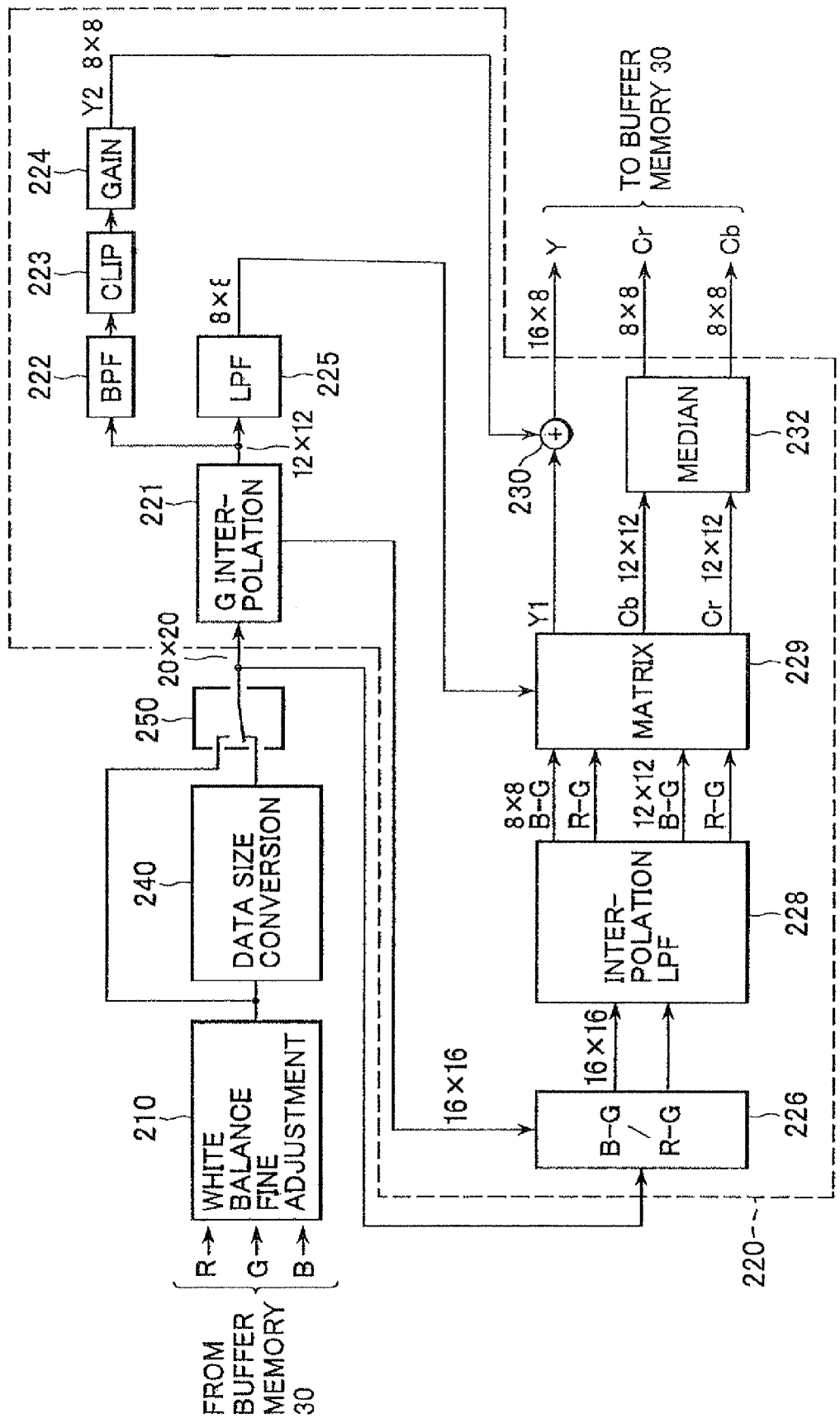
FIG. 4 is a block diagram for explanation of a circuit which performs block processing in the signal processing system shown in FIG. 2.

FIGS. 3 and 4 are block diagrams showing the details of the image processing circuit 29. FIG. 3 shows a line processing circuit 100 which performs line by line signal processing upon the image data from the CCD 26. The 12 bit R, G, and B signals which are outputted from the A/D conversion circuit 28 are subjected to the abovementioned image pre-processing. And FIG. 4 shows a block processing circuit 200 which performs signal processing upon the image data which have been processed by the line processing circuit 100 for each n×m pixels data at a time, in other words one block at a time. Image post-processing may be performed upon the image data in the manner described above for each 20×20 pixel region, for each 16×16 pixel region, for each 12×12 pixel region, or for each 8×8 pixel region, as appropriate. It should be understood that, in this specification, the image processing circuit 29 will be explained in terms of a hardware implementation thereof for the convenience of description, although in actual fact it could be implemented in software by utilizing a plurality of processors.

In FIG. 3, the line processing circuit 100 is shown as being comprised of a defect correction circuit 101, a digital clamp circuit 102, a gain circuit 103, a white balance circuit 104, a black level circuit 105, a gamma correction circuit 106, and an average value and histogram calculation circuit 107.

The defect correction circuit 101 corrects the data in the output of the CCD 26, each line at a time in point order (point by point), for any pixels which have any defect (which are specified in advance, and whose addresses are set into registers of the CPU 21). For each line at a time in point order, the digital clamp circuit 102 subtracts from the signal for each pixel of this line outputted by the CCD 26 the weighted average of the signals from a plurality of pixels, which are thus used as so-called optical black. For each line at a time in the output of the CCD 26 in point order, the gain circuit 103 impartially multiplies each of the R, G, and B signals which are outputted from the CCD 26 by a predetermined gain, and also performs deviation correction of the sensitivity of the CCD 26 for the G signal. Moreover, the gain circuit 103 also performs deviation correction of sensitivity ratio of the CCD 26 for the R and B signals.

For each line at a time in the output of the CCD 26 in point order, the white balance circuit 104 multiplies the R and B signals by the white balance adjustment coefficients which are determined in advance as described above and are stored in advance in the registers of the CPU 21, in other words by the R gain and the B gain. Based upon the image data which have been corrected by this white balance circuit 104, the white balance is further subjected to fine adjustment by a white balance fine adjustment circuit which will be described hereinafter. For each line at a time in the output of the CCD 26 in point order, the black level circuit 105 adds to each of the R, G, and B signals a value which is determined in advance and is stored in a register of the CPU 21. And the gamma correction circuit 106 performs gamma correction using a gradation look up table for each line at a time in the output of the CCD 26 in point order. It should be understood that the 12 bit R, G, and B signals are converted by this gamma correction into 8 bit RGB data.

Figure 5:
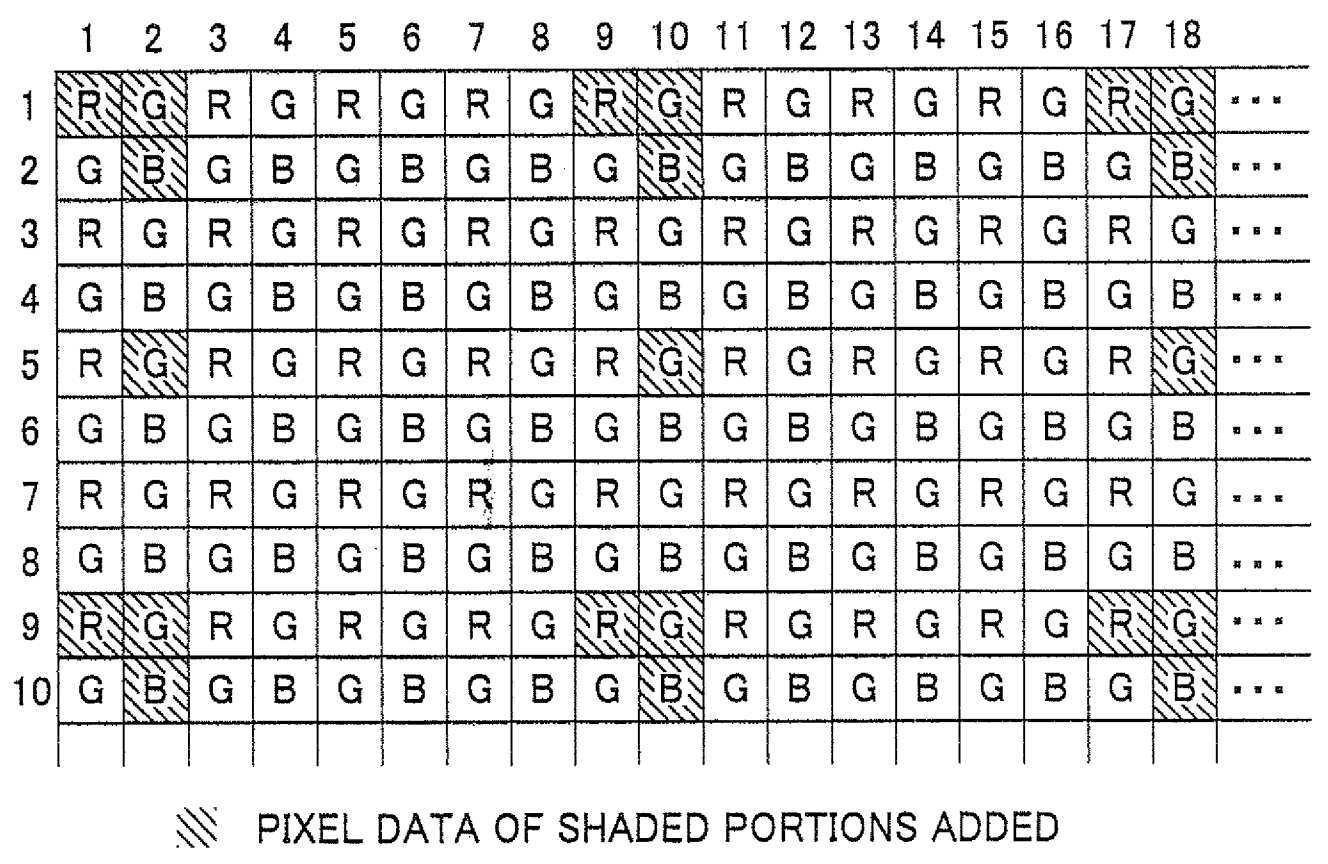

The average value and histogram calculation circuit 107 extracts from within the image data after gamma correction the image data for a 512×512 region which is specified, for example, by taking the central portion of the focus detection region as a center, and calculates a RF-gain for white balance fine adjustment for the R signal and a BF-gain for white balance fine adjustment for the B signal using the following Equations (1) and (2). These calculated values for the RF-gain and the BF-gain are stored in registers of the CPU 21. FIG. 5 is a figure showing a color separation filter which is arranged over the pixel region of the CCD 26 and which utilizes the Bayer arrangement. For example, if an arrangement of color filters like that shown in FIG. 5 is provided over the above mentioned specified 512×512 pixel region, the average values of the R, G, and B signals are calculated by using the Equations (3) through (5), and, as shown in Equations (1) and (2), the RF-gain and the BF-gain for white balance fine adjustment are calculated from the ratio of the average value G-ave of the G signal to the average value R-ave of the R signal, and the ratio of the average value G-ave of the G signal to the average value B-ave of the B signal, respectively.

[Equations 1]

$$RF\text{-gain} = G\text{-ave}/R\text{-ave} \quad (1)$$

$$BF\text{-gain} = G\text{-ave}/B\text{-ave} \quad (2)$$

in which:

$$R\text{-ave} = R\text{-sum}/R\text{-pixel number} \quad (3)$$

$$G\text{-ave} = G\text{-sum}/G\text{-pixel number} \quad (4)$$

$$B\text{-ave} = B\text{-sum}/B\text{-pixel number} \quad (5)$$

It has been found by experience that excellent results are obtained for adjustment of white balance (the overall white balance) by this average value method in which the average values for gradation of each of the R, G, and B signals resulting from the input data are obtained.

In FIG. 4, the block processing circuit 200 is comprised of a white balance fine adjustment circuit 210, an image data size conversion processing circuit 240, a changeover circuit 250, and an interpolation/contour processing circuit 220. The white balance fine adjustment circuit 210 performs fine adjustment of the white balance, with respect to the R signal and the B signal which are stored in the buffer memory 30 after the above described processing up to the gamma correction circuit 106, by multiplying each of the R and B signals in the specified pixel region by, respectively, the RF-gain and the BF-gain which are used for white balance fine adjustment and which have been calculated by the average value circuit 107.

If data size conversion has been set by the use of the resize switch 40, the image data size conversion processing circuit 240 converts the amount of data, in other words the data size, which has been generated for one photographic frame of image data without performing any subsampling process. The image data after data size conversion is outputted as image data for each 20×20 pixel region. The present invention is distinguished in particular by the fact that data size conversion is performed without discarding the order of the color components which corresponds to the arrangement of the color components of the color separation filter which is disposed over the pixel region of the CCD 26, and moreover without lowering the spatial frequency of the image data. During conversion of the data size, it goes without saying that information relating to the contours of the photographic subject and so on is preserved.

In this description of the first preferred embodiment of the present invention, the example will be employed of performing size conversion for a single frame by an area ratio of 9/16, in other words when resizing the data size in both the vertical direction and the horizontal direction by a ratio of 3/4. The term of resizing means that a new image data which has pixels a number of which is different from and values of which are different from the image data before resizing is generated and that a new pixel plane which has a spatial frequency different from one in the image data before resizing is generated. The resizing process calculates the data for one pixel by linear interpolation by using data of the same color signals which correspond to two adjacent pixels which position every two pixels. In this 3/4 resizing process, the data for three pixels is calculated per the data for each four pixels. The term of calculating by liner interpolation means, as mentioned hereinafter, that weighted coefficients are obtained by taking the relative positional relationship between pixels before resizing and new pixels generated by resizing into account and a weighted addition is performed with the weighted coefficients. As a result, a pixel position after resizing is not overlapped with a pixel position before resizing and a new plane which has a spatial frequency different from a plane before resizing is generated.

In the horizontal direction, the first RGRG . . . line shown in FIG. 5 will be considered. For example, let the target pixel n be the one in the first row and the first column which provides a R signal. The values of the R component and the G component after the resizing procedure are calculated according to the following Equations (6) through (11):

[Equations 2]

$$R(1,1) = \{n + (n+2)\}/2 \quad (6)$$

$$G(1,2) = \{(n+1) + (n+3)\}/2 \quad (7)$$

$$R(1,3) = \{5(n+2) + 27(n+4)\}/32 \quad (8)$$

$$G(1,4) = \{5(n+3) + 27(n+5)\}/32 \quad (9)$$

$$R(1,5) = \{27(n+6) + 5(n+8)\}/32 \quad (10)$$

$$G(1,6) = \{27(n+7) + 5(n+9)\}/32 \quad (11)$$

According to the above Equations (6) through (11), for the R component, the three R components R(1,1), R(1,3), and R(1,5) in the group of target pixels from n to (n+8), in other words in a range over which 5 R signals are obtained, are calculated at almost equal intervals in the horizontal direction. Furthermore, for the G component, the three G components G(1,2), G(1,4), and G(1,6) in the group of target pixels from (n+1) to (n+9), in other words in a range over which 5 G signals are obtained, are calculated at almost equal intervals in the horizontal direction. When calculating the data for each of the three colors using Equations (6) through (11), the next data are calculated by taking the target pixel (n+8) as the new target pixel. Accordingly the 3/4 resizing procedure calculates three data elements from four, since among the groups described above of 5 R signals and G signals the end one overlaps the first one of the next group.

Next, again in the horizontal direction, the second GBGB . . . line shown in FIG. 5 will be considered. Taking the target pixel n as the one in the second row and the first column which provides a G signal, then the values of the G component and the B component after the resizing procedure are calculated according to the following Equations (12) through (17):

[Equations 3]

$$G(2,1) = \{n + (n+2)\}/2 \quad (12)$$

$$B(2,2) = \{(n+1) + (n+3)\}/2 \quad (13)$$

$$G(2,3) = \{5(n+2) + 27(n+4)\}/32 \quad (14)$$

$$B(2,4) = \{5(n+3) + 27(n+5)\}/32 \quad (15)$$

$$G(2,5) = \{27(n+6) + 5(n+8)\}/32 \quad (16)$$

$$B(2,6) = \{27(n+7) + 5(n+9)\}/32 \quad (17)$$

According to the above Equations (12) through (17), for the G component, the three G components G(2,1), G(2,3), and G(2,5) in the group of target pixels from n to (n+8), in other words in a range over which 5 G signals are obtained, are calculated at almost equal intervals in the horizontal direction. Furthermore, for the B component, the three B components B(2,2), B(2,4), and B(2,6) in the group of target pixels from (n+1) to (n+9), in other words in a range over which 5 B signals are obtained, are calculated at almost equal intervals in the horizontal direction. When calculating the data for each of the three colors using Equations (12) through (17), the next data are calculated by taking the target pixel (n+8) as the new target pixel n. Accordingly the 3/4 resizing procedure calculates three data elements from four, since among the groups described above of 5 G signals and B signals the end one overlaps the first one of the next group. The RGRG . . . line and the GBGB . . . line before size conversion respectively become a RGRG . . . line and a GBGB . . . line after size conversion, and thus the order of arrangement of the color components in each line before and after the resizing procedure is the same.

The same procedure is performed for resizing the image data, which has been resized in the horizontal direction, in the vertical direction. Since the order of arrangement of the color components is the same before and after the resizing procedure, as described above, this procedure for the vertical direction will be explained with reference to FIG. 5. In this figure, for the RGRG line in the first column, taking the target pixel m as the one in the first row and the first column which provides a R signal, then the values of the R component and the G component after the resizing procedure are calculated according to the following Equations (18) through (23):

[Equations 4]

$$R(1,1)=\{m+(m+2)\}/2 \tag{18}$$

$$G(2,1)=\{(m+1)+(m+3)\}/2 \tag{19}$$

$$R(3,1)=\{5(m+2)+27(m+4)\}/32 \tag{20}$$

$$G(4,1)=\{5(m+3)+27(m+5)\}/32 \tag{21}$$

$$R(5,1)=\{27(m+6)+5(m+8)\}/32 \tag{22}$$

$$G(6,1)=\{27(m+7)+5(m+9)\}/32 \tag{23}$$

According to the above Equations (18) through (23), for the R component, the three R components R(1,1), R(3,1), and R(5,1) in the group of target pixels from m to (m+8), in other words in a range over which 5 R signals are obtained, are calculated at almost equal intervals in the vertical direction. Furthermore, for the G component, the three G components G(2,1), G(4,1), and G(6,1) in the group of target pixels from (m+1) to (m+9), in other words in a range over which 5 G signals are obtained, are calculated at almost equal intervals in the vertical direction. When calculating the data for each of the three colors using Equations (18) through (23), the next data are calculated by taking the target pixel (m+8) as the new target pixel. Accordingly the 3/4 resizing procedure calculates three data elements from four, since among the groups described above of 5 R signals and G signals the end one overlaps the first one of the next group.

Next, again in the vertical direction, the second GBGB . . . column shown in FIG. 5 will be considered. Taking the target pixel m as the one in the first row and the second column which provides a G signal, then the values of the G component and the B component after the resizing procedure are calculated according to the following Equations (24) through (29):

[Equations 5]

$$G(1,2)=\{m+(m+2)\}/2 \tag{24}$$

$$B(2,2)=\{(m+1)+(m+3)\}/2 \tag{25}$$

$$G(3,2)=\{5(m+2)+27(m+4)\}/32 \tag{26}$$

$$B(4,2)=\{5(m+3)+27(m+5)\}/32 \tag{27}$$

$$G(5,2)=\{27(m+6)+5(m+8)\}/32 \tag{28}$$

$$B(6,2)=\{27(m+7)+5(m+9)\}/32 \tag{29}$$

According to the above Equations (24) through (29), for the G component, the three G components G(1,2), G(3,2), and G(5,2) in the group of target pixels from m to (m+8), in other words in a range over which 5 G signals are obtained, are calculated at almost equal intervals in the vertical direction. Furthermore, for the B component, the three B components B(2,2), B(4,2), and B(6,2) in the group of target pixels from (m+1) to (m+9), in other words in a range over which 5 B signals are obtained, are calculated at almost equal intervals in the vertical direction. When calculating the data for each of the three colors using Equations (24) through (29), the next data are calculated by taking the target pixel (m+8) as the new target pixel m. Accordingly the 3/4 resizing procedure calculates three data elements from four, since among the groups described above of 5 G signals and B signals the end one overlaps the first one of the next group. The RGRG . . . line and the GBGB . . . line before size conversion respectively become a RGRG . . . line and a GBGB . . . line after size conversion, and thus the order of arrangement of the color components in each line before and after the resizing procedure is the same.

As explained above, by performing resizing processing by a ratio of 3/4 in both the horizontal direction and in the vertical direction, it is possible to convert the amount of data which is generated for one photographic image to 9/16 of its size. It should be understood that, although for the convenience of explanation the calculation procedures for the horizontal direction and for the vertical direction have been explained as being done separately, in actual fact, the calculation procedures in both these directions may be performed together as a matrix calculation. The results are the same when performing these calculations for the two directions together, as if they were to be performed separately and independently.

The changeover circuit 250, upon commands from the CPU 21 (see FIG. 2), outputs to the interpolation/contour processing circuit 220 either the image data for the 20×20 pixel region which is output in order from the white balance fine adjustment circuit 210, or the image data for the 20×20 pixel region which is output in order from the image data size conversion processing circuit 240.

The interpolation/contour processing circuit 220 performs formatting procedures for data compression according to the JPEG method for the block data of each 20×20 pixel region in order, for the image data after white balance fine adjustment, or after image data size conversion. As results of this formatting procedure a Y signal of a 16×8 pixel region, a Cb signal of an 8×8 pixel region, and a Cr signal of an 8×8 pixel region are generated. The luminance signal Y includes a luminance signal Y1 for the low frequency component of the G signal and a contour signal Y2 for its high frequency component, as will be described hereinafter.

This interpolation/contour processing circuit 220 is comprised of a G interpolation circuit 221, a band pass filter (BPF) 222, a clip circuit 223, a gain circuit 224, a low pass filter (LPF) 225, a color difference signal generation circuit 226, an interpolation/low pass filter (LPF) circuit 228, a matrix circuit 229, an adder 230, and a median circuit 232.

The G interpolation circuit 221 calculates by interpolation the G component for the pixel regions of the R signal or the B signal for the data in the 16×16 pixel region around the center of each block signal for each 20×20 pixel region of the image data which is inputted from the white balance fine adjustment circuit 210, or from the image data size conversion processing circuit 240. In other words, as shown in FIG. 6, for the input data set D20 for a 20×20 pixel region, the G interpolation circuit 221 calculates the G component of the vacancy (which is the pixel in the third row and the third column, and provides a B signal) in the middle of the 5×5 pixel data region D51 (from row 1 column 1 to row 5 column 5), and substitutes this value as the G component of the pixel in the third row and the third column of the output data set D16 (in which the "B" is surrounded by a circle) of the 16×16 pixel region.

Next, with regard to the input data set D20 of the 20×20 pixel region, the G component of the vacancy (which is the pixel in the fourth row and the fourth column, and provides a R signal) in the center of the 5×5 pixel data region D52 (from the second row second column to the sixth row sixth column) is calculated, and this value is substituted as the G component of the pixel in the fourth row and the fourth column of the output data set D16 (in which the "R" is surrounded by a circle) of the 16×16 pixel region. By repeating this type of procedure, the G interpolation procedure is performed for all the vacancies of the 16×16 pixel region, and thus the output data set D16 is obtained. And on the one hand the output data set D12 from this 12×12 pixel region is outputted respectively to the band pass filter 222 and the low pass filter 225, while on the other hand the output data set D16 from the 16×16 pixel region is outputted to the color difference signal generation circuit 226.

Figure 7:
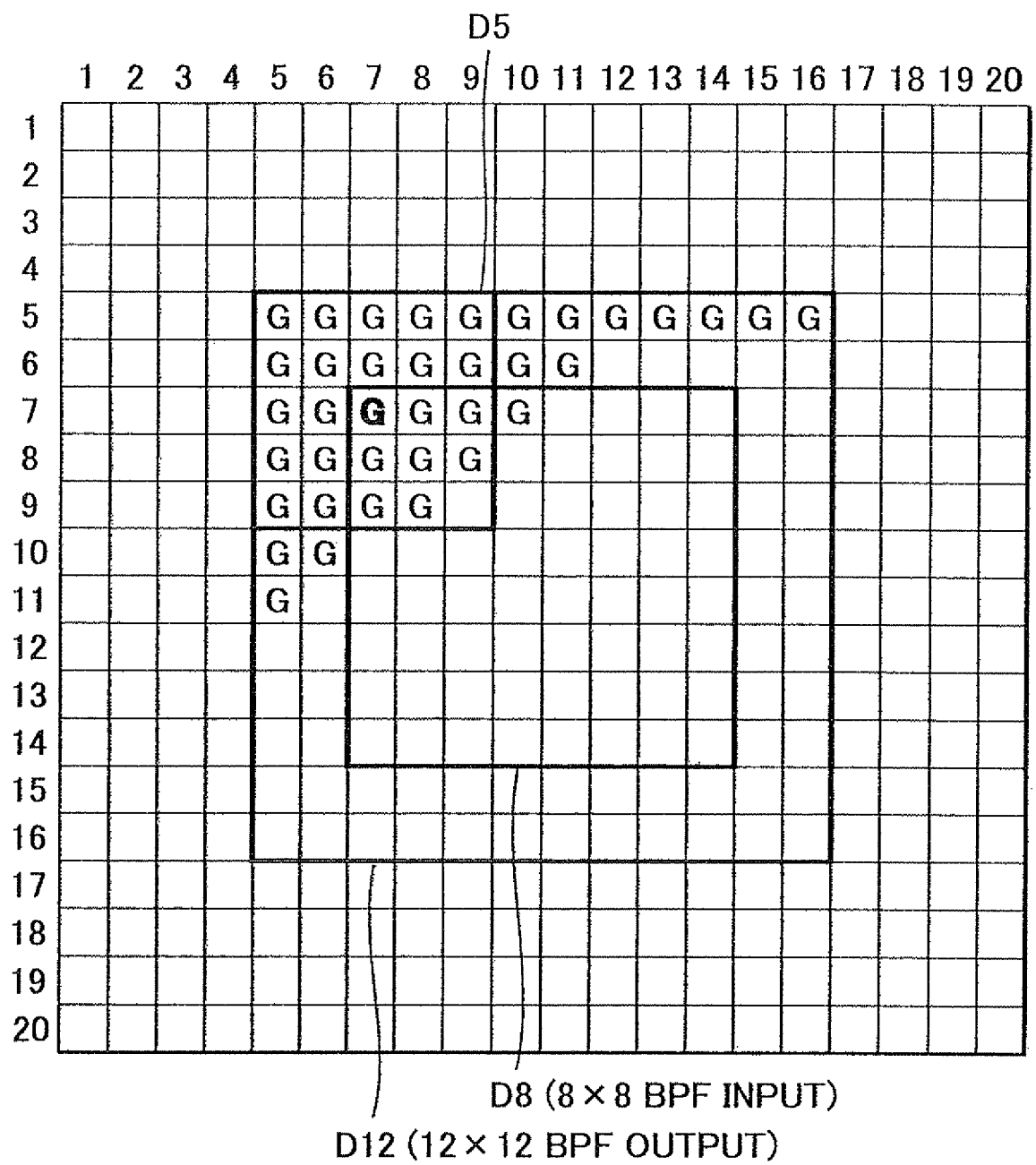
FIG. 7 is a figure for explanation of the details of the processing performed by a band pass filter.

The band pass filter 222 extracts the medium frequency component from the G signal of the 12×12 pixel region which is outputted from the G interpolation circuit 221 (however, this is the frequency component which is high enough to be able to extract the contour of the photographic subject, and it may for convenience be termed the high frequency component). In other words, as shown in FIG. 7, for the input data set D12 for a 12×12 pixel region, the BPF output data is obtained by multiplying the 5×5 pixel region data D5 (from row 5 column 5 to row 9 column 9) by the bandpass filter coefficient, and this value is substituted as the data item (the bold "G") in the seventh row and seventh column of the output data set D8 of the 8×8 pixel region. By repeating this type of procedure, all of the pixel data for the 8×8 pixel region is substituted with the G data after BPF, and thus the output data set D8 is generated.

The clip circuit 223 clips and cuts each element in the 8×8 pixel data region D8 which is output from the band pass filter 222 to a set level. The gain circuit 224 multiplies the output of the clip circuit 223 by a gain which is set in advance.

Figure 8:
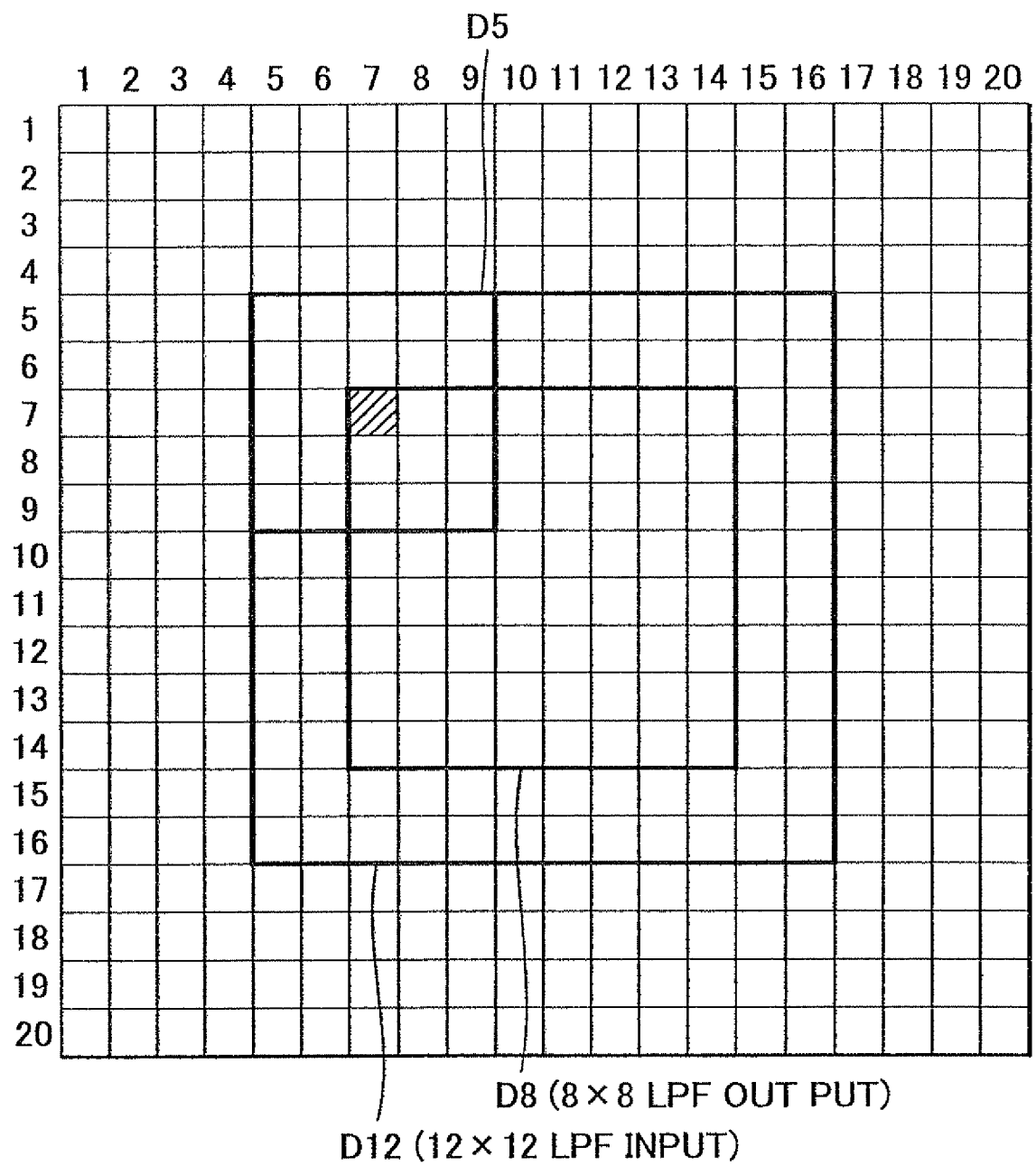
FIG. 8 is a figure for explanation of the details of the processing performed by a low pass filter.

The low pass filter 225 extracts the low frequency component in the G signal of the 12×12 pixel region which is outputted from the G interpolation circuit 221. In other words, as shown in FIG. 8, for the input data region D12 of the 12×12 pixel region, the 5×5 pixel data region D5 (from the fifth row and fifth column to the ninth row and ninth column) is multiplied by the low pass filter coefficient and the LPF output data is obtained, and this value is substituted as the data (the hatched region) for the seventh row and seventh column of the 8×8 pixel region output data set D8. By repeating this type of procedure, all of the pixel data for the 8×8 pixel region is substituted with the G data after LPF, and thus the output data set D8 is generated.

Figure 9:
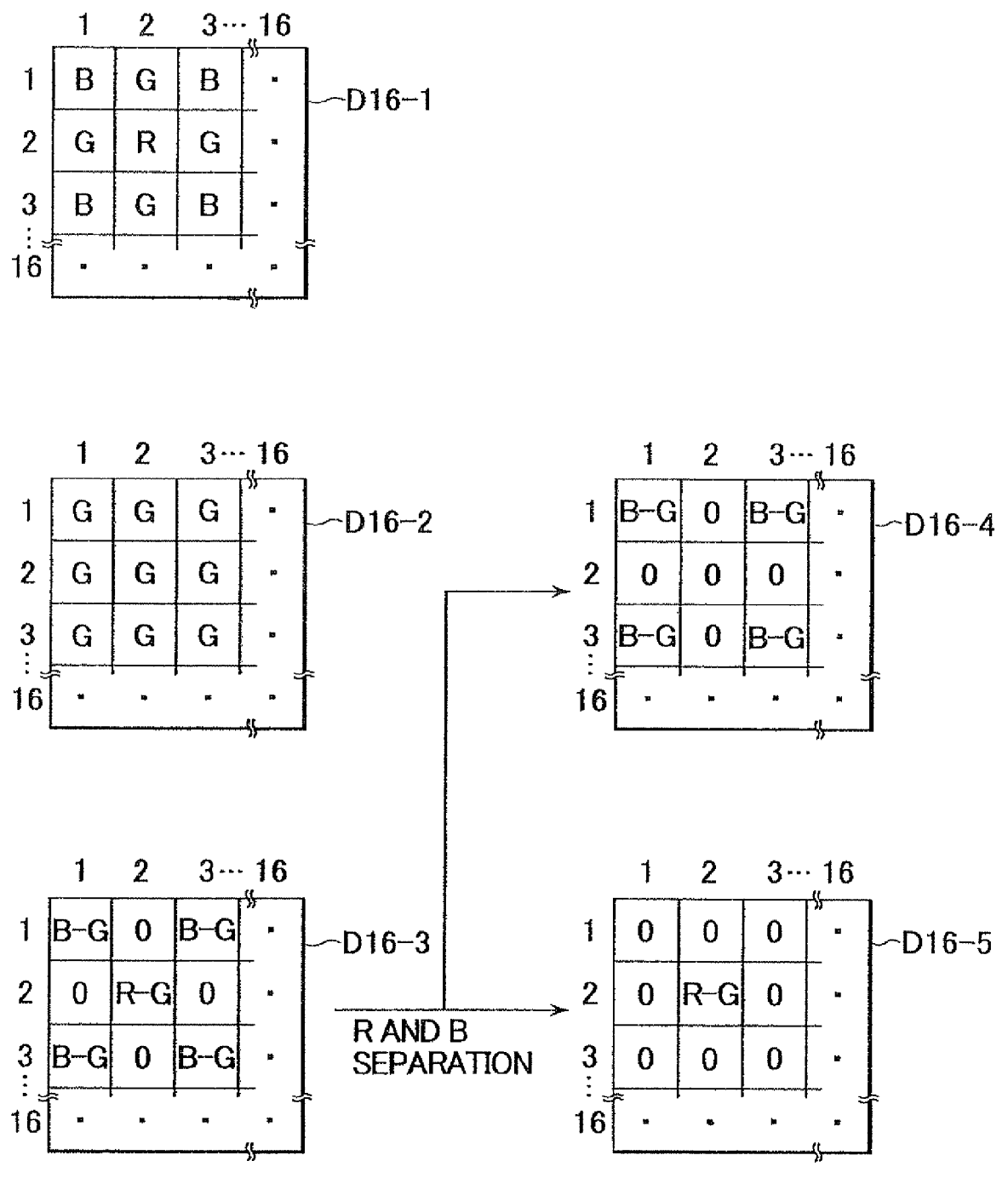

The color difference signal generation circuit 226, as shown in FIG. 9, generates intermediate data D16-3 which include a (B-G) signal and a (R-G) signal, based upon the RGB signal input data D16-1 for the 16×16 pixel region and the G signal input data D16-2 for the 16×16 pixel region which has been outputted from the G interpolation circuit 221, among the image data which has been inputted from the white balance fine adjustment circuit 210 or the image data size conversion processing circuit 240. Furthermore, the intermediate data D16-3 is separated into output data D16-4 of a (B-G) color difference signal and output data D16-5 of a (R-G) color difference signal.

The interpolation/LPF circuit 228 inputs the 8 bit (B-G) signal and (R-G) signal of the 16×16 pixel region which are outputted from the color difference signal generation circuit 226, performs interpolation calculation for this (B-G) signal and (R-G) signal one 5×5 pixel region at a time, and also simultaneously performs a low pass filtering procedure in which it extracts the low band signal therefrom, so that as a result it outputs a (B-G) signal and a (R-G) signal of a 12×12 pixel region to the Cb and Cr matrix sections of the matrix circuit 229 respectively. Furthermore, a (B-G) signal and a (R-G) signal of a 8×8 pixel region are outputted to a Y matrix section of the matrix circuit 229.

When the R-G data for the 5×5 pixel region are as shown in FIG. 10, the above described interpolation calculation and low pass filtering procedure are given by the following Equation (30):

[EQUATIONS 6]

$$InterpR-G(i,j) = \\ [\{R-G(i-2,j-2)+R-G(i+2,j-2)+R-G(i-2,j+2)+ \\ R-G(i+2,j+2)\} \times kc1 + \\ \{R-G(i-2,j-2)+R-G(i+2,j-2)+R- \\ G(i-1,j+2)+R-G(i+1,j+2)\} \times kc2 + \\ \{R-G(i,j-2)+R-G(i,j+2)\} \times kc3 + \\ \{R-G(i-1,j-1)+R-G(i+1,j-1)+R- \\ G(i-1,j+1)+R-G(i+1,j+1)\} \times kc5 + \\ \{R-G(i-2,j-1)+R-G(i+2,j-1)+R- \\ G(i-2,j+1)+R-G(i+2,j+1)\} \times kc4 + \\ \{R-G(i,j-1)+R-G(i,j+1)\} \times kc6 + \\ \{R-G(i-2,j)+R-G(i+2,j)\} \times kc7 + \\ \{R-G(i-1,j)+R-G(i+1,j)\} \times kc8 + \\ \{R-G(i,j)\} \times kc9]/(2^{\wedge}Ktr-g) \tag{30}$$

where kc1-kc9 and Ktr-g are coefficients.

Generally, if both an interpolation filter and a band limiting LPF are performed at the same time, there is a limitation upon the filter coefficient, as follows. For the sake of clarity, the concept will be explained in terms of a single dimension. It will be supposed that, among the sampling points after interpolation, the actual sampling points are at a period of N. For example, suppose that the sampling points after interpolation are a, a, b, b, a, a, b, b, . . . , where the points a are actual sampling points and the points b are interpolated points. Thus in this example the period N is 4. When performing interpolation with an odd-number degree symmetrical digital filter of (2n+1) degree (where (2n+1) is larger than N), if the actual sampling points are uniform, it is necessary for the sampling points after interpolation also to be uniform, which implies that the filter coefficients are constrained as described below.

If the k-th filter coefficient is termed C(k), it is necessary for N sets of the sum of coefficients to be equal to one another.

[EQUATIONS 7]

$$2\Sigma C(N \times i) = \Sigma[C(N \times i + 1) + C(N \times i + N - 1)] \\ \vdots \\ = \Sigma[C(N \times i + k) + C(N \times i + N - k)]$$

Here, as filter coefficient indices, i is an integer greater than or equal to zero and less than or equal to (2n+1), while k is an integer greater than or equal to zero and less than n.

In the two dimensional case, it will be acceptable to construct a two dimensional filter by implementing together two filters which are constrained in the same manner in the horizontal direction and in the vertical direction respectively. In this first preferred embodiment of the present invention, N is equal to 2 since the sampling points are interpolated at a period of two pixels as shown in FIGS. 5 and 10, and the sums of the odd numbered filter coefficients and the sums of the even numbered filter coefficients must be equal. In other words, $$\Sigma C(2*i) = \Sigma C(2*i+1)$$

And, in the two dimensional case, with a 5 degree×5 degree symmetrical type filter as in the above mentioned Equation (30), a following equation is achieved.

$$4*kc1+2*kc3+4*kc5+2*kc7+kc9=4*kc2+4*kc4+2*kc6+2*kc8$$

Figure 11:
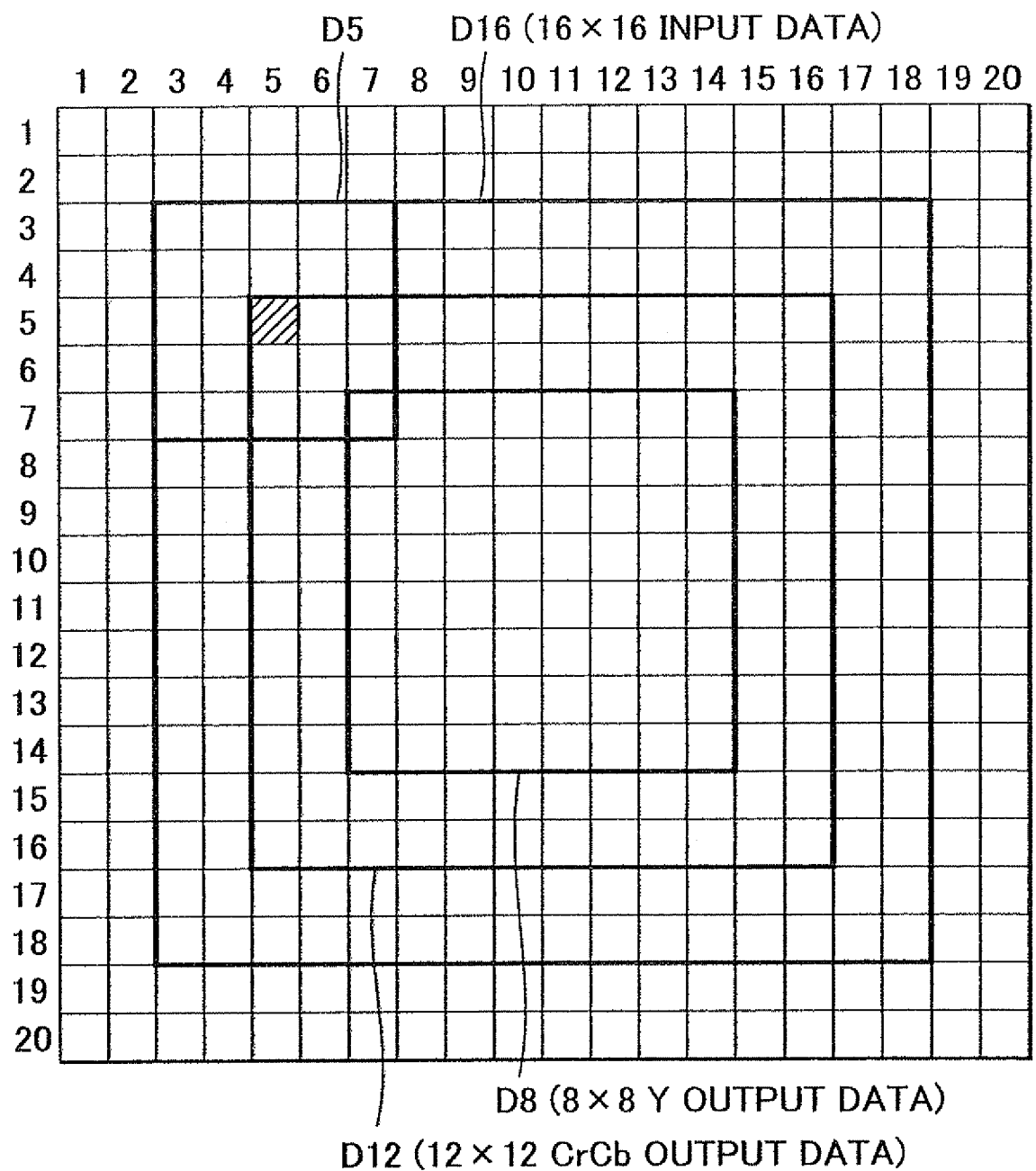
FIG. 11 is a figure for explanation of the details of the processing performed by this interpolation/LPF circuit.

As an example, the case will be explained of performing interpolation/LPF processing upon the (R-G) signal while referring to FIG. 11. For the (R-G) signal of the input data set D16 for the 16×16 pixel region, the data set D5 for the 5×5 pixel region (from the third row third column to the seventh row seventh column) is multiplied by the interpolation/LPF filter coefficient, and the (R-G) data for its central region (the fifth row and the fifth column) are calculated, and this is substituted as the fifth row fifth column data element in the output data set D12 for the 12×12 pixel region. By repeating this type of procedure, all of the pixel data for the 12×12 pixel region for the (R-G) signal is subjected to interpolation/LPF processing, and thus the output data set D12 is obtained. The same procedure is performed for the (B-G) signal, and thus the output data for the 12×12 pixel region is generated.

The matrix circuit 229 comprises a Y matrix section, a Cb matrix section, and a Cr matrix section. The Y matrix section inputs the (B-G) signal and the (R-G) signal of the 8×8 pixel region from the interpolation/LPF circuit 228, and also inputs the G signal of the 8×8 pixel region from the low pass filter 225, and generates a luminance signal Y1 for the low frequency component of the 8×8 pixel region according to the following Equation (31).
[Equation 8]

$$Y1(i,j)=[Mkg \times G(i,j)+Mkr1 \times R-G(i,j)+Mkb1 \times B-G(i,j)] \quad (31)$$

where Mkg, Mkr1, and Mkb1 are matrix coefficients.

The Cb matrix section and the Cr matrix section respectively input the (B-G) signal and the (R-G) signal of the 12×12 pixel region from the interpolation/LPF circuit 228, and respectively generate a Cb signal and a Cr signal of the 12×12 pixel region according to the following Equations (32) and (33).
[Equations 9]

$$Cr(i,j)=[Mkr2 \times R-G(i,j)+Mkb2 \times B-G(i,j)] \quad (32)$$

$$Cb(i,j)=[Mkr3 \times R-G(i,j)+Mkb3 \times B-G(i,j)] \quad (33)$$

where Mkr2, Mkr3, Mkb2 and Mkb3 are matrix coefficients.

The adder 230 adds together the luminance signal Y1 of the low frequency component of the 8×8 pixel region which is outputted from the matrix circuit 229, and the contour extraction signal Y2 of the high frequency component of the 8×8 pixel region which is outputted from the gain circuit 224. This contour extraction signal Y2 which is outputted from the gain circuit 224 consists of the high frequency component extracted from the G signal of the 16×16 pixel region which has been G interpolated, in other words of an extracted contour. Accordingly a luminance/contour extraction signal Y (Y1+Y2) for the image as a whole is calculated by adding together in the adder 230 the luminance signal Y1 which is calculated according to the above Equation (31) and the contour extraction signal Y2 which is calculated by the gain circuit 224. The result of this addition is stored in the buffer memory 30.

The median circuit 233 inputs the Cb signal and the Cr signal of the 12×12 pixel region which are outputted from the matrix circuit 229, performs median processing by utilizing the nine points of 3×3 pixels which are included in the 5×5 pixel region, and outputs the Cb signal and the Cr signal of the 8×8 pixels.

Figure 12:
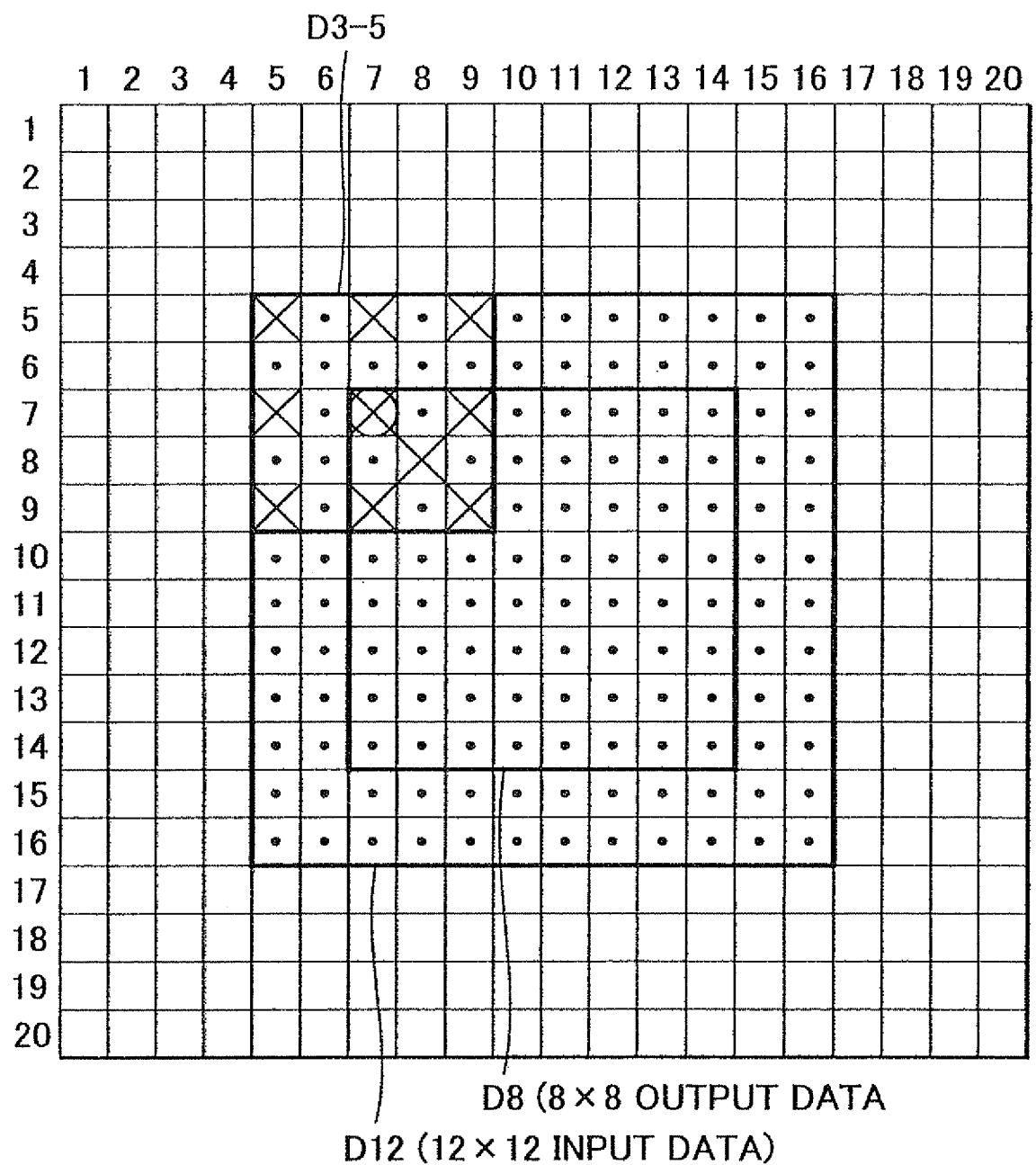
FIG. 12 is a figure for explanation of the details of the processing performed by a median circuit.

In the median processing procedure of this first preferred embodiment of the present invention, as shown in FIG. 12, among the data D12 (these data elements are marked with black dots) for then 12×12 pixels, the median filtering procedure is performed upon the nine data elements D3-5 (marked with "X") of 3×3 pixels (from the fifth row fifth column to the ninth row ninth column) which are included in a 5×5 pixel region. In other words, these nine elements of data are sorted into ascending or descending order, and the median value thereof is taken as the data value after median processing. And the data item after median processing which is obtained is substituted as the output data item D8 in the seventh row seventh column of the 8×8 pixels. By repeating this type of procedure, the output data D8 of the 8×8 pixels is obtained for the Cb signal and the Cr signal. The output data, consisting of the Cr signal and the Cb signal, is stored in the buffer memory 30.

For each of the input data elements in the 20×20 pixel region which has been inputted to the block processing circuit 200 as described above, based upon the Y signal of the 16×8 pixels which is generated by the adder circuit 230 and upon the Cr signal and the Cb signal of the 8×8 pixels which are generated by the median circuit 232, the JPEG compression circuit 33 extracts as one unit the Y, Cr, and Cb signals which have been formatted to an 8×8 pixel by the JPEG compress ion method, and thus compresses the entire image by repeating a per se known compression method. The compressed image data are stored upon the recording medium 34 via the CPU 21.

Figure 13:
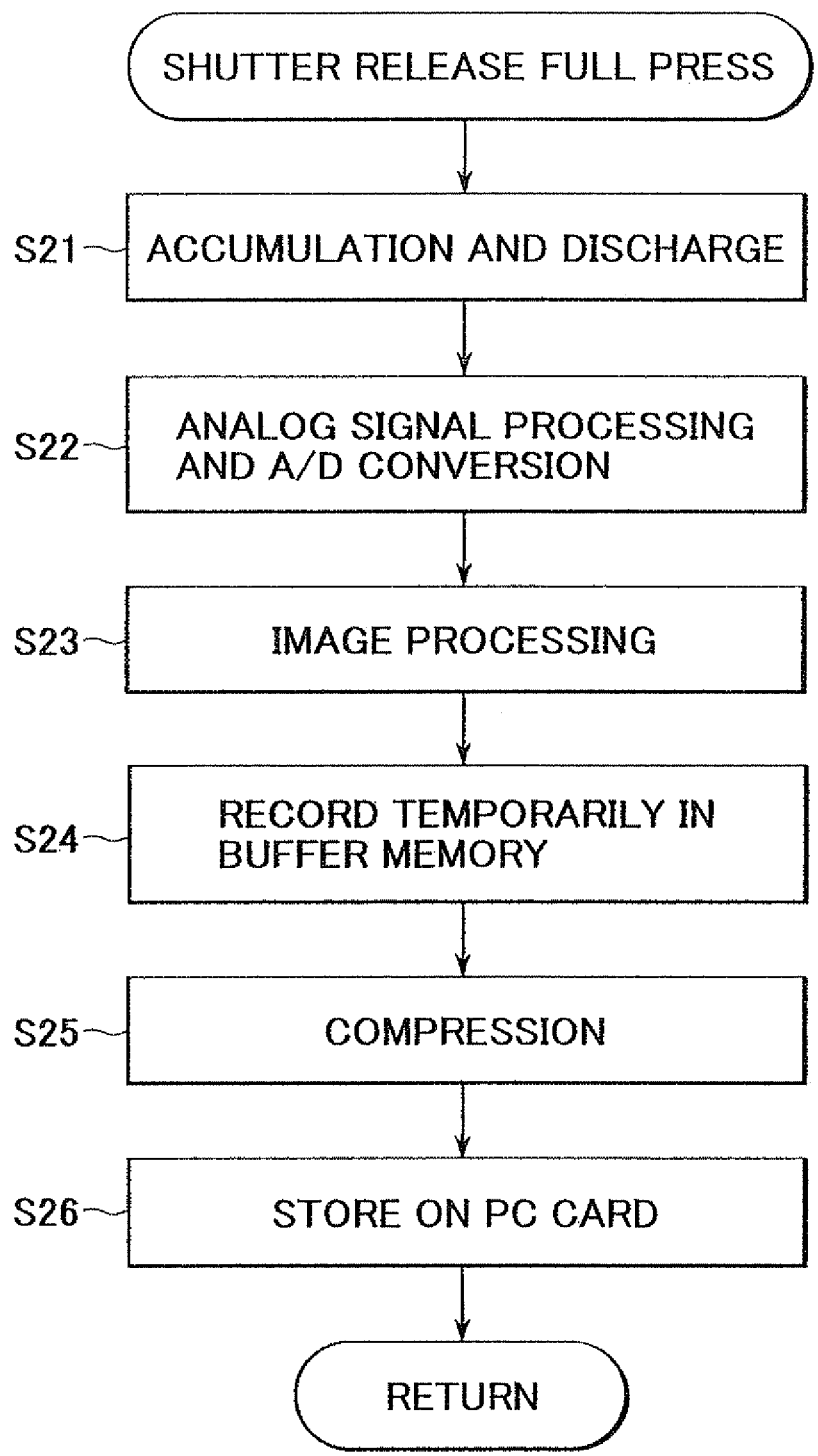
FIG. 13 is a flow chart showing a program which is started when a full press switch is actuated.

The operation of an electronic still camera according to the above construction will now be explained. When the full press switch 23 is actuated by the shutter release button being pressed, the quick return mirror is raised away from the optical path, and the execution of the photographic sequence program shown in FIG. 13 is commenced. In a step S21, each of the pixels of the CCD 26 accumulates electric charge, and after this accumulation has been completed the accumulated electric charge for all said pixels is read out (discharged) in order. In the next step S22, after the read out image signal has been processed by the analog signal processing circuit 27, it is converted into digital image data by the A/D conversion circuit 28. In the next step S23, this image data is inputted into the image processing circuit 29, and the image processing described above is performed. This image processing circuit 29 performs procedures such as white balance adjustment, gamma gradation correction, image data size conversion processing, JPEG formatting processing, etc. When this image processing has been completed the flow of control proceeds to the next step S24, in which the image data after image processing is temporarily stored in the buffer memory 30. In the next step S25, the image data is read out from the buffer memory 30, and this data is compressed by the JPEG compression circuit 33. And in a subsequent final step S26, the image data after compression is stored upon the recording medium 34, and then the procedure shown in FIG. 13 terminates.

According to the first preferred embodiment of the present invention as explained above, the following beneficial effects and results are obtained.

(1) The image data size conversion processing circuit 240 performs resizing processing upon the digital image data before the G interpolation processing is performed by the G interpolation circuit 221 interior to the interpolation/contour processing circuit 220. For example, in the opposite case of performing resizing processing after formatting processing has been performed by the interpolation/contour processing circuit 220, it would be necessary to perform resizing processing for the Y signal, the Cb signal, and the Cr signal which were calculated by the formatting processing, i.e. for an amount of image data equivalent to the content of three images. By contrast, according to this first preferred embodiment of the present invention, it is sufficient to perform resizing processing for only the amount of image data corresponding to a single image containing the R, G, and B signals. Accordingly, as compared with the alternative case of performing resizing processing for the Y signal, the Cb signal, and the Cr signal and thus for an amount of image data equivalent to the content of three images, it is possible greatly to reduce the processing time and also the required memory capacity.

(2) The Bayer arrangement of the color components of the image data, in other words of the R, G, and B signals, is preserved both before and after the image data size conversion processing circuit 240 performs the resizing processing. Accordingly, the interpolation/contour processing circuit 220, without any relationship with the presence or absence of resizing processing, is able to perform block processing by unifying n×m pixels (where n and m may be 20, 16, 12, or 8) and treating them a single block as described above. In other words, the data after resizing processing and the data which did not perform resizing processing can perform block processing with a common algorithm. By this means, the image data size conversion processing circuit 240 does not impose any change upon the circuitry of a conventional electronic still camera, and can easily be added later.

(3) The image data size conversion processing circuit 240 calculates the data for one pixel by linear interpolation using the data of the same color signals of two pixels each of which is positioned every two pixels, so as to reduce the size of the data. Accordingly, it is possible to convert at any desired reduction ratio, which is different from the case where the data size is converted by a subsampling procedure. Furthermore, a high quality resized image is obtained in which there is no tendency to generate moire due to subsampling, since the generation of color artifact and reduction of the spatial frequency are suppressed by the calculation by linear interpolation.

In the above described resizing procedure, the data for one pixel is calculated by linear interpolation by using the data of the same color signals of the adjacent two pixels which have another pixel between them. It would also be possible to perform an interpolation procedure based upon a Sin c function by using the data of the same color signals of the adjacent five or six pixels each of which sits every two pixels. To explain this with reference to FIG. 5, for example, in the case of performing a resizing procedure by 3/4 in both the horizontal direction and the vertical direction, taking the position held by the R signal in the first row and first column as the target pixel n, the values of the R component and of the G component after the resizing procedure in the horizontal direction are given by the following Equations (34) through (39):

[Equations 10]

$$R(1,1)=\{-3n-4(n+2)+70(n+4)+70(n+6)-4(n+8)-3(n+10)\}/128 \quad (34)$$

$$G(1,2)=\{-3(n+1)-4(n+3)+70(n+5)+70(n+7)-4(n+9)-3(n+11)\}/128 \quad (35)$$

$$R(1,3)=\{-10(n+4)+42(n+6)+88(n+8)+16(n+10)-8(n+12)\}/128 \quad (36)$$

$$G(1,4)=\{-10(n+5)+42(n+7)+88(n+9)+16(n+11)-8(n+13)\}/128 \quad (37)$$

$$R(1,5)=\{-8(n+6)+16(n+8)+88(n+10)+42(n+12)-10(n+14)\}/128 \quad (38)$$

$$G(1,6)=\{-8(n+7)+16(n+9)+88(n+11)+42(n+13)-10(n+15)\}/128 \quad (39)$$

According to the above Equations (34) through (39), for the R component, in the range in which the four R signals from the target pixel (n+4) through (n+10) are obtained, the three R components R(1,1), R(1,3), and R(1,5) are calculated at almost equal intervals in the horizontal direction. Furthermore, for the G component, in the range in which the four G signals from the target pixel (n+5) through (n+11) are obtained, the three G components G(1,2), G(1,4), and G(1,6) are calculated at almost equal intervals in the horizontal direction. When three data elements for each color are calculated according to the above Equations (34) through (39), the next data are calculated by setting the target pixel (n+8) as the new target pixel n. The calculations for the GBGB . . . line in the horizontal direction are identical. The RGRG . . . line and the GBGB . . . line before size conversion respectively also become the RGRG . . . line and the GBGB . . . line after size conversion as well, and the order of arrangement of the color components before and after the resizing procedure is the same.

The same procedure is performed in the vertical direction upon the image data which have been subjected to the above described resizing procedure in the horizontal direction. For the first RGRG . . . column in FIG. 5, taking the position held by the R signal in the first row and first column as the target pixel m, the values of the R component and of the G component after the resizing procedure in the horizontal direction are given by the following Equations (40) through (45):

[Equations 11]

$$R(1,1)=\{-3m-4(m+2)+70(m+4)+70(m+6)-4(m+8)-3(m+10)\}/128 \quad (40)$$

$$G(2,1)=\{-3(m+1)-4(m+3)+70(m+5)+70(m+7)-4(m+9)-3(m+11)\}/128 \quad (41)$$

$$R(3,1)=\{-10(m+4)+42(m+6)+88(m+8)+16(m+10)-8(m+12)\}/128 \quad (42)$$

$$G(4,1)=\{-10(m+5)+42(m+7)+88(m+9)+16(m+11)-8(m+13)\}/128 \quad (43)$$

$$R(5,1)=\{-8(m+6)+16(m+8)+88(m+10)+42(m+12)-10(m+14)\}/128 \quad (44)$$

$$G(6,1)=\{-8(m+7)+16(m+9)+88(m+11)+42(m+13)-10(m+15)\}/128 \quad (45)$$

If the calculations for the GBGB . . . line in the vertical direction are performed in the same manner, it is possible to convert the data which constitute a single photographic image by 3/4 in both the horizontal direction and the vertical direction, in other words to convert the size of the entire data set by 9/16. It should be understood that, although for the convenience of explanation the calculation procedures for the horizontal direction and for the vertical direction have been explained as being done separately, in actual fact, the calculation procedures in both these directions may be performed together as a matrix calculation. The results are the same when performing these calculations for the two directions together, as if they were to be performed separately and independently.

Embodiment 2

In the following description of the second preferred embodiment of the present invention, by way of example, the case will be explained of converting the size of a single photographic image by 9/4, in other words of resizing the data size of a single image both in the horizontal direction and in the vertical direction by 3/2. This resizing procedure calculates the data for one pixel by linear interpolation using the data of the same color signals of the adjacent two pixels each of which is from every two pixels. In this 3/2 resizing procedure, the data of three pixels is calculated based upon the data of two pixels.

In the horizontal direction, the first RGRG . . . line shown in FIG. 5 will be considered. For example, let the position held by the R signal upon the first line and the first column be taken as the target pixel n. The values of the R component and of the G component in the horizontal direction after the resizing procedure are given by the following Equations (46) through (51)
[Equations 12]

$$R(1,1)=\{64n+64(n+2)\}/128 \tag{46}$$

$$G(1,2)=\{64(n+1)+64(n+3)\}/128 \tag{47}$$

$$R(1,3)=\{108(n+2)+20(n+4)\}/128 \tag{48}$$

$$G(1,4)=\{108(n+3)+20(n+5)\}/128 \tag{49}$$

$$R(1,5)=\{20(n+2)+108(n+4)\}/128 \tag{50}$$

$$G(1,6)=\{20(n+3)+108(n+5)\}/128 \tag{51}$$

According to the above Equations (46) through (51), for the R component, the group from the target pixel n to (n+4), in other words the three R components R(1,1), R(1,3), and R(1,5) are calculated at almost equal intervals in the horizontal direction in the range which is held by three R signals. Furthermore, for the G component, the group from the target pixel (n+1) to (n+5), in other words the three G components G(1,2), G(1,4), and G(1,6) are calculated at almost equal intervals in the horizontal direction in the range which is held by three G signals. When three data elements for each color are calculated according to the above Equations (46) through (51), the next data set is calculated by setting the target pixel (n+4) as the new target pixel n. Accordingly a 3/2 resizing procedure is performed, since, from the group of the three R signals and three G signals described above, the tail one overlaps the head one of the next group, thus ensuring that three data elements are calculated from two. The calculations for the GBGB . . . line in the horizontal direction are identical. The RGRG . . . line and the GBGB . . . line before size conversion respectively also become the RGRG . . . line and the GBGB . . . line after size conversion as well, and the order of arrangement of the color components before and after the resizing procedure is the same.

The same procedure is performed in the vertical direction upon the image data which have been subjected to the above described resizing procedure in the horizontal direction. For the first RGRG . . . column in FIG. 5, taking the position held by the R signal in the first row and first column as the target pixel m, the values of the R component and of the G component after the resizing procedure in the horizontal direction are given by the following Equations (52) through (57):
[Equations 13]

$$R(1,1)=\{64m+64(m+2)\}/128 \tag{52}$$

$$G(2,1)=\{64(m+1)+64(m+3)\}/128 \tag{53}$$

$$R(3,1)=\{108(m+2)+20(m+4)\}/128 \tag{54}$$

$$G(4,1)=\{108(m+3)+20(m+5)\}/128 \tag{55}$$

$$R(5,1)=\{20(m+2)+108(m+4)\}/128 \tag{56}$$

$$G(6,1)=\{20(m+3)+108(m+5)\}/128 \tag{57}$$

When three data elements for each color are calculated according to the above Equations (52) through (57), the next data set is calculated by setting the target pixel (n+4) as the new target pixel n. If the calculations for the GBGB . . . lines in the vertical direction are performed in the same manner, it is possible to convert the data which constitute a single photographic image by 3/2 in both the horizontal direction and the vertical direction, in other words to convert the size of the entire data set by 9/4. It should be understood that, although for the convenience of explanation the calculation procedures for the horizontal direction and for the vertical direction have been explained as being done separately, in actual fact, the calculation procedures in both these directions may be performed together as a matrix calculation. The results are the same when performing these calculations for the two directions together, as if they were to be performed separately and independently.

According to the second preferred embodiment of the present invention as explained above, it is contrived to be able to increase the image data size, since the image data size conversion processing circuit 240 calculates the data for one pixel by linear interpolation using the data of the same color signals of the adjacent two pixels which have another pixel between them. Furthermore, any desired magnification ratio may be employed. Yet further, there is no deterioration of the image quality after resizing, since the generation of color artifact and reduction of the spatial frequency are suppressed by the calculation by linear interpolation.

In the above described resizing procedure, the data for one pixel is calculated by linear interpolation by using the data of the same color signals of the adjacent two pixels each of which is from every two pixels. It would also be possible to perform an interpolation procedure based upon a Sin c function by using the data of the same color signals of the adjacent four pixels each of which sits every two pixels. To explain this with reference to FIG. 5, for example, in the case of performing a resizing procedure by 3/2 in both the horizontal direction and the vertical direction, taking the position held by the R signal in the first row and first column as the target pixel n, the values of the R component and of the G component after the resizing procedure in the horizontal direction are given by the following Equations (58) through (63):
[Equations 14]

$$R(1,1)=\{-12n+76(n+2)+76(n+4)-12(n+6)\}/128 \tag{58}$$

$$G(1,2)=\{-12(n+1)+76(n+3)+76(n+5)-12(n+7)\}/128 \tag{59}$$

$$R(1,3)=\{-11(n+2)+122(n+4)+19(n+6)-2(n+8)\}/128 \tag{60}$$

$$G(1,4)=\{-11(n+3)+122(n+5)+19(n+7)-2(n+9)\}/128 \tag{61}$$

$$R(1,5)=\{-2(n+2)+19(n+4)+122(n+6)-11(n+8)\}/128 \tag{62}$$

$$G(1,6)=\{-2(n+3)+19(n+5)+122(n+7)-11(n+9)\}/128 \tag{63}$$

According to the above Equations (58) through (63), for the R component, in the range which is held by the three R signals from the target pixel (n+2) to (n+6), the three R components R(1,1), R(1,3), and R(1,5) are calculated at almost equal intervals in the horizontal direction. Furthermore, for the G component, in the range which is held by the three G signals from the target pixel (n+3) to (n+7), the three G components G(1,2), G(1,4), and G(1,6) are calculated at almost equal intervals in the horizontal direction. When three data elements for each color are calculated according to the above Equations (58) through (63), the next data set is calculated by setting the target pixel (n+4) as the new target pixel n. Accordingly a 3/2 resizing procedure is performed, since, from the group of the three R signals and three G signals described above, the tail ones overlap the head ones of the next group, thus ensuring that three data elements are calculated from two. The calculations for the GBGB . . . lines in the horizontal direction are identical. The RGRG . . . lines and the GBGB . . . lines before size conversion respectively also become the RGRG . . . lines and the GBGB . . . lines after size conversion as well, and the order of arrangement of the color components before and after the resizing procedure is the same.

The same procedure is performed in the vertical direction upon the image data which have been subjected to the above described resizing procedure in the horizontal direction. For the first RGRG . . . column in FIG. 5, taking the position held by the R signal in the first row and first column as the target pixel m, the values of the R component and of the G component after the resizing procedure in the horizontal direction are given by the following Equations (64) through (69):
[Equations 15]

$$R(1,1) = \{-12m + 76(m+2) + 76(m+4) - 12(m+6)\}/128 \quad (64)$$

$$G(2,1) = \{-12(m+1) + 76(m+3) + 76(m+5) - 12(m+7)\}/128 \quad (65)$$

$$R(3,1) = \{-11(m+2) + 122(m+4) + 19(m+6) - 2(m+8)\}/128 \quad (66)$$

$$G(4,1) = \{-11(m+3) + 122(m+5) + 19(m+7) - 2(m+9)\}/128 \quad (67)$$

$$R(5,1) = \{-2(m+2) + 19(m+4) + 122(m+6) - 11(m+8)\}/128 \quad (68)$$

$$G(6,1) = \{-2(m+3) + 19(m+5) + 122(m+7) - 11(m+9)\}/128 \quad (69)$$

If the calculations for the GBGB . . . lines in the vertical direction are performed in the same manner, it is possible to convert the data which constitute a single photographic image by 3/2 in both the horizontal direction and the vertical direction, in other words to convert the size of the entire data set by 9/4. It should be understood that, although for the convenience of explanation the calculation procedures for the horizontal direction and for the vertical direction have been explained as being done separately, in actual fact, the calculation procedures in both these directions may be performed together as a matrix calculation. The results are the same when performing these calculations for the two directions together, as if they were to be performed separately and independently.

Although the case of the use of a color separation filter of the Bayer type has been explained in the above, it is also possible to apply the present invention in the case of the complementary color filter arrangement method. FIG. 14 is a figure for explanation of a color separation filter in which G colored, Ye colored, Cy colored, and Ma colored complementary color filters are arranged in correspondence with the pixels of the CCD 26. It is also possible to perform resizing procedures by the various methods described above in this case in which the filters for the same color component are arranged every two pixels in both the horizontal direction and in the vertical direction in this manner.

It should be understood that the present invention may also be utilized for image data of a single color in which the entire data that constitutes a single photographic image is constituted by the G component for example.

In the above description of the first preferred embodiment the case was explained of reduction resizing processing at an area ratio of 9/16, while with the second preferred embodiment the case of magnification resizing processing at an area ratio of 9/4 was explained. The resizing procedure of the present invention can be set at will to any resizing ratio, and in this aspect it differs from the simple prior art subsampling procedure. Accordingly, the resizing ratio may be set to any desired value, and is not to be considered as being limited to the values described above.

Although in the above described preferred embodiments the case has been explained of application to an electronic still camera, it is also possible, when performing the resizing procedure upon a personal computer, to store the image data size conversion processing circuit 240 in the form of software as an image data size conversion processing program upon a recording medium such as a CD-ROM or a floppy disk or the like. In such a case, the image data which has been imaged by the CCD and has been converted to digital form is stored upon a recording medium for image data of high capacity, and, after this recording medium has been set into a personal computer and the image data has been read thereinto, a resizing procedure like the one described above is performed by the above described image data size conversion processing program. For example, in FIG. 3, it is possible to store the raw original R, G, and B output data from the gamma correction circuit 106 upon the recording medium 34, to set this recording medium 34 into a personal computer, and to perform the resizing procedure upon the raw data.

Instead of reading in this image data size conversion processing program from a storage medium upon which said program is stored by using a personal computer, it would also be acceptable to take advantage of a transmission medium such as the Internet or the like for transmitting the above described image data size conversion processing program. In this case, the above described conversion process for the image data size is performed after the transmitted program has been read into a personal computer.

Figure 16:
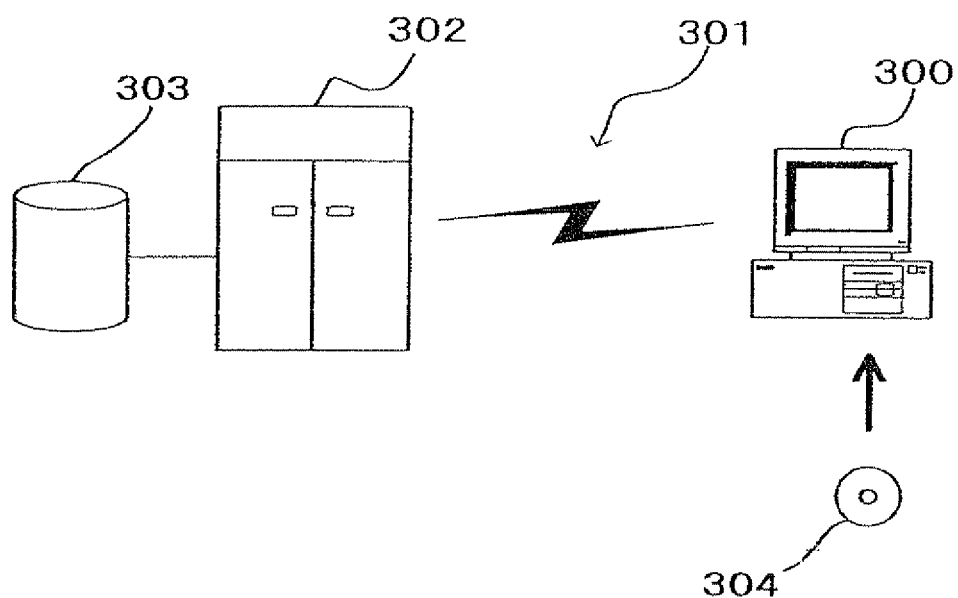
FIG. 16 is a figure illustrating that an image data size conversion processing program is provided via a recording medium or a telecommunication line.

FIG. 16 illustrates how this may be achieved. A personal computer 300 performs the image data size conversion processing explained above. The personal computer 300 has a function of connecting with a telecommunication line 301. A computer 302 is a server computer which provides the image data size conversion processing program and stores the image data size conversion processing program in a recording medium such as a hard disk 303. The telecommunication line 301 may be a telecommunication line for connection with the Internet, for personal computer communication or the like or it may be a dedicated telecommunication line. The computer 302 reads out the image data size conversion processing program stored in the hard disk 303, and transmits the image data size conversion processing program to the personal computer 300 via the telecommunication line 301. In other words, the image data size conversion processing program is embodied in a carrier wave as a data signal and is transmitted via the telecommunication line 301. In case of providing the image data size conversion processing program with a recording medium, a CD-ROM 304 or the like is employed. Thus, the image data size conversion processing program is provided as various kinds of computer-readable computer program product, such as a recording medium, a carrier wave and the like.

Although the present invention has been explained in terms of its application to a single lens reflex electronic still camera, it should be understood that the present invention can also be applied to the case of an electronic still camera which is not equipped with an interchangeable lens, or to a digital video camera which takes a moving image.

Although in the above described preferred embodiments only one example of the circuit structure has been shown, for example, the following modification thereof is also possible. In the G interpolation processing, the BPF processing, the LPF processing, and the interpolation/LPF processing which are performed by the block processing circuit 200, the explanation has been made in terms of performing image processing in single units of any one of 20×20, 16×16, 12×12, and 8×8 blocks. In correspondence therewith, the explanation has been made in terms of the image data size conversion processing circuit 240 outputting image data after resizing in units of a 20×20 pixel region. However, the block size for such processing is not to be considered as being limited to the above cited example values; it would also be acceptable, for example, to perform the image processing in units of one 5×5 pixel region.

In the above explanation, the image data size conversion processing circuit 240 performed the resizing processing upon the image data after white balance fine adjustment. As described above, it is possible to reduce the resize processing time and the memory capacity which is required for the resizing procedure by performing the resizing procedure before performing the pixel interpolation procedure. Accordingly, provided that the resizing procedure is performed upon the image data before the pixel interpolation procedure, it does not necessarily need to be performed after the white balance fine adjustment, and it may be performed, for example, upon the image data after it has been digitally clamped by the line processing circuit of FIG. 3.

To explain the correspondence between the various structural elements mentioned in the Claims and the various structural elements of the disclosed preferred embodiments of this invention: the R component, the G component, and the B component corresponds to the plurality of color components; the color separation filter corresponds to the color separation means; the CCD 26 corresponds to the imaging means; the A/D conversion circuit 28 corresponds to the A/D conversion means; the image data size conversion processing circuit 240 corresponds to the data size conversion means; and the interpolation/contour processing circuit 220 corresponds to the image processing means.

What is claimed is:

1. An image data processing apparatus comprising:
a data size conversion device that changes a data size of an image data at an optional ratio from a first image data to a second image data, the first image data having a plurality of pixels each of which includes one of a plurality of color components, the plurality of color components being arranged in a specific order, and each pixel of the second image data having a newly calculated color component value, wherein
the newly calculated color component value of the each pixel of the second image data is calculated by the data size conversion device based upon color component values of a plurality of same color pixels of the first image data,
a newly calculated color component value of a first pixel of the second image data being calculated by the data size conversion device based upon color component values of a first plurality of same color pixels of the first image data, the first pixel and the first plurality of same color pixels having a same color component of the plurality of color components, and
a newly calculated color component value of a second pixel of the second image data being calculated by the data size conversion device based upon color component values of a second plurality of same color pixels of the first image data, the second pixel and the second plurality of same color pixels having the same color component of the plurality of color components,
the data size conversion device calculates the newly calculated color component value of the each pixel while maintaining an order of arrangement of the plurality of color components from the first image data to the second image data,
the data size conversion device uses a first coefficient to calculate the newly calculated color component value of the first pixel of the second image data and uses a second coefficient to calculate the newly calculated color component value of the second pixel of the second image data, wherein the first coefficient and the second coefficient are different, according to a difference between (1) a first positional relationship of the first pixel of the second image data and the first plurality of same color pixels of the first image data and (2) a second positional relationship of the second pixel of the second image data and the second plurality of same color pixels of the first image data, the first positional relationship and the second positional relationship being different from each other
the first pixel and the second pixel are lined in order as pixels of the same color component in the second image data,
the first plurality of same color pixels of the first image data are lined in order as pixels of the same color component in the first image data, and
the second plurality of same color pixels of the first image data are lined in order as pixels of the same color component in the first image data.

2. An image data processing apparatus according to claim 1, further comprising:
an interpolation processing device that performs interpolation processing to obtain a color component value that a corresponding pixel does not possess, wherein
the data size conversion device changes the data size of the image data from the first image data to the second image data before the second image data is subjected to interpolation processing by the interpolation processing device.

3. An image data processing apparatus according to claim 2, further comprising:
a changeover device that changes over image data to be supplied to the interpolation device between (1) the second image data and (2) the first image data, wherein
the interpolation processing device performs the interpolation processing with a common algorithm on both the second image data.

4. An image data processing apparatus, comprising:
a color separation device in which a plurality of color filters are arranged in a specified order, each of the plurality of color filters (1) passes light of one of a plurality of color components, and (2) separates an image of a subject into the plurality of color components;

an imaging device that images, with a plurality of pixels, the image of the subject that has been color-separated by the color separation device;

an A/D conversion device that performs an A/D conversion of an image signal outputted from the imaging device; and a data size conversion device that changes a data size of the image data after the A/D conversion at an optional ratio from a first image data to a second image data, the each pixel of the second image data having a newly calculated color component value, wherein:

the newly calculated color component value of the each pixel of the second image data is calculated by the data size conversion device based upon color component values of a plurality of same color pixels of the first image data, a newly calculated color component value of a first pixel of the second image data being calculated by the data size conversion device based upon color component values of a first plurality of same color pixels of the first image data, the first pixel and the first plurality of same color pixels having a same color component of the plurality of color components, and a newly calculated color component value of a second pixel of the second image data being calculated by the data size conversion device based upon color component values of a second plurality of same color pixels of the first image data, the second pixel and the second plurality of same color pixels having the same color component of the plurality of color components, the data size conversion device calculates the newly calculated color component value of the each pixel while maintaining an order of arrangement of the plurality of color components from the first image data to the second image data, the data size conversion device uses a first coefficient to calculate the newly calculated color component value of the first pixel of the second image data and uses a second coefficient to calculate the newly calculated color component value of the second pixel of the second image data, wherein the first coefficient and the second coefficient are different, according to a difference between (1) a first positional relationship of the first pixel of the second image data and the first plurality of same color pixels of the first image data and (2) a second positional relationship of the second pixel of the second image data and the second plurality of same color pixels of the first image data, the first positional relationship and the second positional relationship being different from each other, the first pixel and the second pixel are lined in order as pixels of the same color component in the second image data, the first plurality of same color pixels of the first image data are lined in order as pixels of the same color component in the first image data, and the second plurality of same color pixels of the first image data are lined in order as pixels of the same color component in the first image data.

5. An electronic camera comprising:

a color separation device in which a plurality of color filters are arranged in a specified order, each of the plurality of color filters (1) passes light of one of a plurality of color components, and (2) separates an image of a subject into the plurality of color components;

an imaging device that images, with a plurality of pixels, the image of the subject that has been color-separated by the color separation device;

an A/D conversion device that performs an A/D conversion of an image signal outputted from the imaging device; and a data size conversion device that changes a data size of the image data after the A/D conversion at an optional ratio from a first image data to a second image data, the each pixel of the second image data having a newly calculated color component value, wherein the newly calculated color component value of the each pixel of the second image data is calculated by the data size conversion device based upon color component values of a plurality of same color pixels of the first image data, a newly calculated color component value of a first pixel of the second image data being calculated by the data size conversion device based upon color component values of a first plurality of same color pixels of the first image data, the first pixel and the first plurality of same color pixels having a same color component of the plurality of color components, and a newly calculated color component value of a second pixel of the second image data being calculated by the data size conversion device based upon color component values of a second plurality of same color pixels of the first image data, the second pixel and the second plurality of same color pixels having the same color component of the plurality of color components, the data size conversion device calculates the newly calculated color component value of the each pixel while maintaining an order of arrangement of the plurality of color components from the first image data to the second image data, the data size conversion device uses a first coefficient to calculate the newly calculated color component value of the first pixel of the second image data and uses a second coefficient to calculate the newly calculated color component value of the second pixel of the second image data, wherein the first coefficient and the second coefficient are different, according to a difference between (1) a first positional relationship of the first pixel of the second image data and the first plurality of same color pixels of the first image data and (2) a second positional relationship of the second pixel of the second image data and the second plurality of same color pixels of the first image data, the first positional relationship and the second positional relationship being different from each other, the first pixel and the second pixel are lined in order as pixels of the same color component in the second image data, the first plurality of same color pixels of the first image data are lined in order as pixels of the same color component in the first image data, and the second plurality of same color pixels of the first image data are lined in order as pixels of the same color component in the first image data.

6. An image data processing method comprising:

obtaining an image data that has a plurality of pixels each of which includes any one of a plurality of color components which are arranged in a specific order; and changing a data size of the image data at an optional ratio from a first image data to a second image data, the each pixel of the second image data having a newly calculated color component value, wherein:

the newly calculated color component value of the each pixel of the second image is calculated based upon color component values of a plurality of same color pixels of the first image data in order to change the data size while maintaining an order of arrangement of the plurality of color components, a newly calculated color component value of (1) a first pixel of the second image data being calculated based upon color component values of a first plurality of same color pixels of the first image data, the first pixel and the first plurality of same color pixels having a same color component of the plurality of color components, and (2) a second pixel of the second image data being calculated by a data size conversion device based upon color component values of a second plurality of same color pixels of the first image data, the second pixel and the second plurality of same color pixels having the same color component of the plurality of color components, the data size conversion device uses a first coefficient to calculate the newly calculated color component value of the first pixel of the second image data and uses a second coefficient to calculate the newly calculated color component value of the second pixel of the second image data, wherein the first coefficient and the second coefficient are different, according to a difference between (1) a first positional relationship of the first pixel of the second image data and the first plurality of same color pixels of the first image data and (2) a second positional relationship of the second pixel of the second image data and the second plurality of same color pixels of the first image data, the first positional relationship and the second positional relationship being different from each other, the first pixel and the second pixel are lined in order as pixels of the same color component in the second image data, the first plurality of same color pixels of the first image data are lined in order as pixels of the same color component in the first image data, and the second plurality of same color pixels of the first image data are lined in order as pixels of the same color component in the first image data.

7. A non-transitory computer-readable recording medium containing a control program for image data size conversion processing, the control program comprising instructions of:

obtaining an image data that has a plurality of pixels each of which includes any one of a plurality of color components which are arranged in a specific order; and changing a data size of the image data at an optional ratio from a first image data to a second image data, the each pixel of the second image data having a newly calculated color component value, wherein:

the newly calculated color component value of the each pixel of the second image data is calculated based upon color component values of a plurality of same color pixels of the first image data in order to change the data size, a newly calculated color component value of a first pixel of the second image data being calculated based upon color component values of a first plurality of same color pixels of the first image data, the first pixel and the first plurality of same color pixels having a same color component of the plurality of color components, and a newly calculated color component value of a second pixel of the second image data being calculated by a data size conversion device based upon color component values of a second plurality of same color pixels of the first image data, the second pixel and the second plurality of same color pixels having the same color component of the plurality of color components, the data size being changed while maintaining an order of arrangement of the plurality of color components from the first image data to the second image data, the data size conversion device uses a first coefficient to calculate the newly calculated color component value of the first pixel of the second image data and uses a second coefficient to calculate the newly calculated color component value of the second pixel of the second image data, wherein the first coefficient and the second coefficient are different, according to a difference between (1) a first positional relationship of the first pixel of the second image data and the first plurality of same color pixels of the first image data and (2) a second positional relationship of the second pixel of the second image data and the second plurality of same color pixels of the first image data, the first positional relationship and the second positional relationship being different from each other, the first pixel and the second pixel are lined in order as pixels of the same color component in the second image data, the first plurality of same color pixels of the first image data are lined in order as pixels of the same color component in the first image data, and the second plurality of same color pixels of the first image data are lined in order as pixels of the same color component in the first image data.

8. The image data processing apparatus according to claim 1, wherein:

the order of each of the first plurality of same color pixels of the first image data and the second plurality of same color pixels of the first image data is the same as the order of the first and second pixel.

9. The image data processing method comprising according to claim 6, wherein:

the order of each of the first plurality of same color pixels of the first image data and the second plurality of same color pixels of the first image data is the same as the order of the first and second pixel.

* * * * *